United States Patent
Fong

(10) Patent No.: US 11,709,571 B2
(45) Date of Patent: Jul. 25, 2023

(54) ROTATABLE KNOB INTERFACE

(71) Applicant: Synaptics Incorporated, San Jose, CA (US)

(72) Inventor: Kelvin Fong, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 0 days.

(21) Appl. No.: 17/728,566

(22) Filed: Apr. 25, 2022

(65) Prior Publication Data

US 2022/0244810 A1    Aug. 4, 2022

Related U.S. Application Data

(63) Continuation of application No. 17/142,667, filed on Jan. 6, 2021, now Pat. No. 11,360,614.

(51) Int. Cl.
G06F 3/0484    (2022.01)
G06F 3/044    (2006.01)
(Continued)

(52) U.S. Cl.
CPC .......... *G06F 3/0442* (2019.05); *G06F 3/0362* (2013.01); *G06F 3/0446* (2019.05);
(Continued)

(58) Field of Classification Search
CPC .. G06F 3/0442; G06F 3/04166; G06F 3/0446; G06F 3/0362; G06F 3/0482;
(Continued)

(56) References Cited

U.S. PATENT DOCUMENTS

| | | | |
|---|---|---|---|
| 9,612,660 | B2 | 4/2017 | Drescher et al. |
| 9,671,954 | B1 | 6/2017 | Jaugilas et al. |
| 2008/0257706 | A1 | 10/2008 | Haag |
| 2009/0009491 | A1 | 1/2009 | Grivna |
| 2014/0042002 | A1 | 2/2014 | Chu |
| 2015/0042600 | A1 | 2/2015 | Lukanc et al. |
| 2017/0097694 | A1 | 4/2017 | Craig et al. |

(Continued)

FOREIGN PATENT DOCUMENTS

KR    1020150071257 A    6/2015

OTHER PUBLICATIONS

"Startup Wants to Put Real Knobs on Your Touchscreen," Synthtopia, Jun. 2014, https://www.synthtopia.com/content/2014/06/27/startup-wants-to-put-real-knobs-on-your-touchscreen/.

(Continued)

*Primary Examiner* — Abdul-Samad A Adediran
(74) *Attorney, Agent, or Firm* — Leydig, Voit & Mayer, Ltd.

(57) ABSTRACT

A method of detecting shift of a rotatable interface is disclosed. The rotatable interface has a fixed base with a conductive region on a bottom surface, the fixed base attached to a display screen of an input device. The method includes providing, during a first time period, a reference signal to first and second sets of electrodes of the input device that are each capacitively coupled to the conductive region. The method further includes, during a second time period, providing the reference signal to the first set of electrodes, providing a sensing signal to the second set of electrodes, and receiving, during the second time period, a resulting signal on the second set of electrodes. The method still further includes determining a translation of the rotatable interface relative to the display screen based, at least in part, on the resulting signal values received during the second time period.

20 Claims, 15 Drawing Sheets

(51) Int. Cl.
*G06F 3/0362* (2013.01)
*G06F 3/041* (2006.01)
*H01H 25/06* (2006.01)
*G06F 3/0485* (2022.01)
*G06F 3/0482* (2013.01)

(52) U.S. Cl.
CPC ......... *G06F 3/04166* (2019.05); *H01H 25/06* (2013.01); *G06F 3/0482* (2013.01); *G06F 3/0485* (2013.01); *H01H 2207/008* (2013.01); *H01H 2239/006* (2013.01)

(58) Field of Classification Search
CPC ..... G06F 3/0485; G06F 3/0393; H01H 25/06; H01H 2207/008; H01H 2239/006
See application file for complete search history.

(56) References Cited

U.S. PATENT DOCUMENTS

| | | |
|---|---|---|
| 2018/0024649 A1 | 1/2018 | Uno |
| 2018/0046267 A1 | 2/2018 | Kobayashi |
| 2018/0284977 A1* | 10/2018 | Ko ........................ G06F 3/0393 |
| 2020/0004345 A1 | 1/2020 | Ju et al. |
| 2020/0278761 A1 | 9/2020 | Takaoka et al. |
| 2021/0286470 A1 | 9/2021 | Takada et al. |

OTHER PUBLICATIONS

U.S. Appl. No. 17/142,667, filed Jan. 6, 2021.

* cited by examiner

ROTATABLE KNOB INTERFACE

CROSS-REFERENCE TO RELATED APPLICATIONS

This application is a continuation of U.S. patent application Ser. No. 17/142,667, filed Jan. 6, 2021, the disclosure of which is incorporated herein by reference in its entirety.

TECHNICAL FIELD

Embodiments of this disclosure relate to a rotatable knob interface.

BACKGROUND

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic systems. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones. Additionally, proximity sensor devices may be implemented as part of a multi-media entertainment system or an automobile. In such cases, it is useful to interface a knob to a proximity sensor device.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A sensing system includes a display panel comprising sensor electrodes, and a processing system coupled to the sensor electrodes. The processing system is configured to operate, during a first period, a first subset of the sensor electrodes for input sensing by driving the first subset with a reference signal, and to operate, during the first period, a second subset of the sensor electrodes for input sensing by driving the second subset with the reference signal. The processing system is further configured to operate, during a second period, the first subset of the sensor electrodes for shift detection by driving the first subset of the sensor electrodes with a sensing signal and receiving resulting signals from the first subset of the sensor electrodes, drive, during the second period, the second subset of the sensor electrodes with the reference signal. The sensing system further includes an electronic device disposed over the display panel, the electronic device including a conductive region configured to couple to each of the first subset of the sensor electrodes and the second subset of the sensor electrodes, wherein the resulting signals received from the first subset of sensor electrodes during the second period are affected based on the position of the conductive region relative to the display panel. The processing system is further configured to, based on the resulting signals, determine a shift of the electronic device relative to the display panel.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

Figure 1:
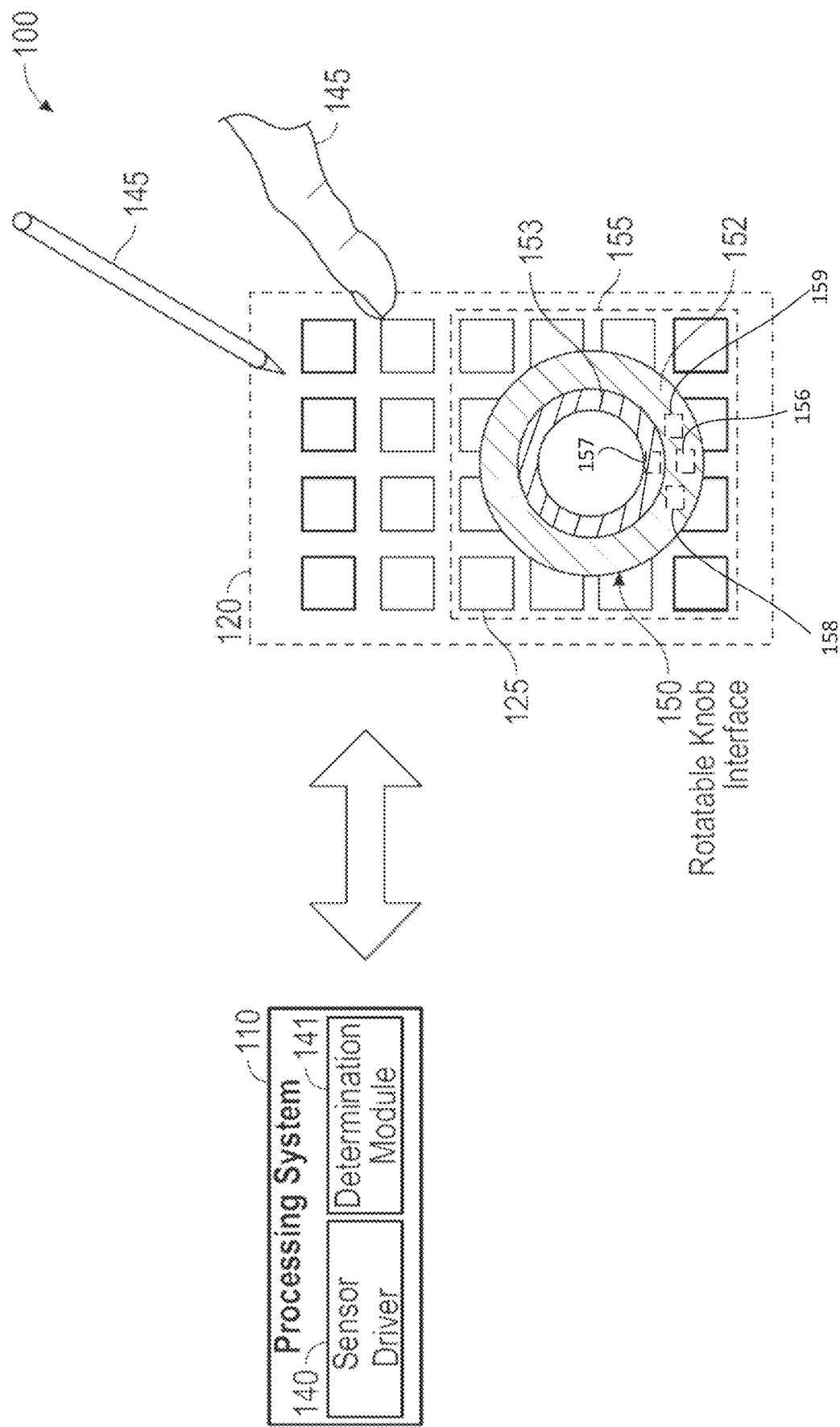
FIG. 1 illustrates an example input device with a rotatable knob interface, according to one or more embodiments.

To facilitate understanding, identical reference numerals have been used, where possible, to designate identical elements that are common to the Figures. It is contemplated that elements disclosed in one embodiment may be beneficially utilized on other embodiments without specific recitation. The drawings should not be understood as being drawn to scale unless specifically noted. Also, the drawings may be simplified and details or components omitted for clarity of presentation and explanation. The drawings and discussion serve to explain principles discussed below, where like designations denote like elements.

DETAILED DESCRIPTION

The following description may use perspective-based descriptions such as top/bottom, in/out, over/under, and the like. Such descriptions are merely used to facilitate the discussion and are not intended to restrict the application of embodiments described herein to any particular orientation.

The following description may use the phrases "in one embodiment," or "in one or more embodiments," or "in some embodiments", which may each refer to one or more of the same or different embodiments. Furthermore, the terms "comprising," "including," "having," and the like, as used with respect to embodiments of the present disclosure, are synonymous.

The terms "coupled with," along with its derivatives, and "connected to" along with its derivatives, may be used herein, including in the claims. "Coupled" or "connected" may mean one or more of the following. "Coupled" or "connected" may mean that two or more elements are in direct physical or electrical contact. However, "coupled" or "connected" may also mean that two or more elements indirectly contact each other, but yet still cooperate or interact with each other, and may mean that one or more other elements are coupled or connected between the elements that are said to be coupled with or connected to each other. The term "directly coupled" or "directly connected" may mean that two or elements are in direct contact.

As used herein, including in the claims, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 is a block diagram of an exemplary electronic device 100 (e.g., an input device or system), in accordance with embodiments of the disclosure. The electronic device 100 may be configured to provide input to an electronic system (not shown), and/or to update one or more devices. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include the electronic device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device. In other embodiments, the electronics system may be part of an automobile, and the electronic device 100 represents one or more sensing devices of the automobile. For example, the electronic device 100 is part of a multimedia entertainment system of an automobile. In one embodiment, an automobile may include multiple electronic devices 100, where each electronic device 100 may be configured differently than the other.

The electronic device 100 can be implemented as a physical part of the electronic system, or can be physically separate from the electronic system. As appropriate, the electronic device 100 may communicate with parts of the electronic system using any one or more of the following: buses, networks, and other wired or wireless interconnections. Example communication protocols include Inter-Integrated Circuit (I²C), Serial Peripheral Interface (SPI), Personal System/2 (PS/2), Universal Serial Bus (USB), Bluetooth®, Radio Frequency (RF), and Infrared Data Association (IrDA) communication protocols.

The electronic device 100 may utilize any combination of sensor components and sensing technologies to detect user input. For example, as illustrated in FIG. 1, the electronic device 100 comprises one or more sensor electrodes 125 that may be driven to detect objects and/or update one or more devices. The sensor electrodes 125 may be part of a capacitive sensing device. In other embodiments, the sensor electrodes 125 are part of an image sensing device, radar sensing device, or ultrasonic sensing device, among others. In one embodiment, the sensor electrodes 125 are discrete sensor electrodes.

In one embodiment, the electronic device 100 includes the display panel 120. In such embodiments, the sensor electrodes 125 are comprised of display electrodes of the display panel 120. For example, the sensor electrodes 125 are comprised of the common voltage electrodes, data lines, or gate lines of the display panel 120. In such embodiments, the sensor electrodes 125 are operated for input sensing and for updating the display of the display panel 120. For example, the sensor electrodes 125 function as the reference voltage electrode of the display panel 120.

Some of the examples described herein include a matrix sensor input device. In such examples, as is illustrated in FIG. 1, the sensor electrodes 125 are disposed in a two dimensional array of rows and columns. Further, as described in detail below, electronic device 100 includes a rotatable knob interface 150 that interacts with one or more of the sensor electrodes 125.

The sensor electrodes 125 may have a similar size and shape. For example, as illustrated in FIG. 1, each of the sensor electrodes 125 is substantially rectangular in shape. In other embodiments, at least one sensor electrode 125 has a different shape and/or size than another at least one sensor electrode 125. For example, the sensor electrodes 125 may be diamond shaped, circular in shape, have interdigitated fingers to increase field coupling, and/or have floating cutouts inside to reduce stray capacitance to nearby electrical conductors. Further, the orientation of the sensor electrodes 125 may differ from that illustrated in FIG. 1.

The sensor electrodes 125 may be disposed in a common layer. For example, the sensor electrodes 125 are disposed on a common side of a substrate. The sensor electrodes 125 may be disposed on lens or encapsulation layer of the display panel 120, or a substrate attached to the display panel 120. In other embodiments, a first one or more of the sensor electrodes 125 is disposed in a first layer and a second one or more of the sensor electrodes 125 is disposed in a second layer. For example, a first one or more of the sensor electrodes 125 is disposed on a first side of a first substrate, and a second one or more of the sensor electrodes 125 is disposed on a second side of the first substrate. In other embodiments, a first one or more of the sensor electrodes 125 is disposed on a first substrate, and a second one or more of the sensor electrodes 125 is disposed on a second substrate.

Some capacitive implementations utilize "self-capacitance" (or "absolute capacitance") sensing methods based on changes in the capacitive coupling between sensor electrodes and one or more input objects. In various embodiments, an input object near the sensor electrodes, such as, for example, input object 145 (e.g., a digit or stylus), alters the electric field near the sensor electrodes 125, thus changing the measured capacitive coupling. In one implementation, an absolute capacitance sensing method operates by modulating sensor electrodes 125 with respect to a reference voltage (e.g., system ground), and by detecting the capacitive coupling between the sensor electrodes and input objects. For example, a resulting signal is received from the modulated sensor electrode or electrodes 125. Modulating the sensor electrodes 125 with respect to a reference voltage includes driving the sensor electrodes 125 with a sensing signal. When operating the sensor electrodes 125 for absolute capacitive sensing, the sensing signal is referred to as an absolute capacitive sensing signal. In such embodiments, the resulting signal comprises effect(s) corresponding to the absolute capacitive sensing signal, and/or to one or more sources of environmental interference (e.g., other electromagnetic signals). The absolute capacitive sensing signal has a varying voltage. Further, the absolute capacitive sensing signal is a periodic or aperiodic signal. The absolute capacitive sensing signal has a square waveform, trapezoidal waveform, sinusoidal waveform, or a sawtooth waveform, among others.

Some capacitive implementations utilize "mutual capacitance" (or "transcapacitance") sensing methods based on changes in the capacitive coupling between two or more of the sensor electrodes 125. An input object (e.g., the input object 145) near the sensor electrodes 125 alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. For example, the transmitter sensor electrodes are driven with a sensing signal. In such embodiments, the sensing signal is referred to as a transcapacitive sensing signal. The transcapacitive sensing signal has a varying voltage. Further, the transcapacitive sensing signal is a periodic or aperiodic signal. The transcapacitive sensing signal has a square waveform, trapezoidal waveform, sinusoidal waveform, or a sawtooth waveform, among others.

Receiver sensor electrodes may be held substantially constant relative to the reference voltage, or modulated with reference to the transmitter sensor electrodes to facilitate receipt of resulting signals. A resulting signal may comprise effect(s) corresponding to one or more transcapacitive sensing signals, and/or to one or more sources of environmental interference (e.g., other electromagnetic signals). Sensor electrodes may be dedicated transmitters or receivers, or may be configured to both transmit and receive.

Capacitive sensing devices may be used for detecting presence and/or position of input objects (e.g., the input object 145) in proximity to and/or touching input sensing regions of an input device. Further, capacitive sensing devices may be used to sense features of an input object, such as a fingerprint. Still further, as in the example of FIG. 1, in one or more embodiments, capacitive sensing devices may be provided with a rotatable knob interface 150 that is electrically coupled to the sensor electrodes 125. The sensor electrodes 125 may be configured to sense the rotary position of the rotatable knob interface 150. For example, the rotatable knob interface 150 may have a home position and a compressed position, and the sensor electrodes 125 may be used to determine when the rotatable knob interface 150 is in the home position or the compressed position based on a change in capacitive coupling of one or more of sensor electrodes 125 with one or more coupling electrodes of the rotatable knob interface 150.

Continuing with reference to FIG. 1, a processing system 110 is shown as part of the electronic device 100. The processing system 110 is configured to operate hardware of the electronic device 100.

The processing system 110 may also comprise electronically-readable instructions, such as firmware code, software code, and/or the like. Components composing the processing system 110 may be located together, such as, for example, near the sensor electrodes 125. Components of the processing system 110 may be physically separate from one or more components in proximity to the sensor electrodes 125 or one or more components elsewhere. For example, the electronic device 100 may be a peripheral coupled to a desktop computer, and the processing system 110 may comprise software configured to run on a central processing unit (CPU) of the desktop computer and one or more integrated circuits (ICs) (perhaps with associated firmware) separate from the CPU. As another example, the electronic device 100 may be physically integrated in a phone, and the processing system 110 may comprise circuits and firmware that are part of a main processor of the phone. Further yet, the processing system 110 may be implemented within an automobile, and the processing system 110 may comprise circuits and firmware that are part of one or more of the electronic control units (ECUs) of the automobile. The processing system 110 is dedicated to implementing the electronic device 100. The processing system 110 may also perform other functions, such as operating display screens, driving haptic actuators, etc.

As illustrated in FIG. 1, the processing system 110 comprises a sensor driver 140. The sensor driver 140 generates the sensing signals, and drives the sensor electrodes 125 with the sensing signals. Further, the sensor driver 140 may be configured to receive resulting signals from the sensor electrodes 125. The processing system 110 comprises parts of or all of one or more integrated circuits (ICs) and/or other circuitry components. The sensor driver 140 includes circuitry configured to generate the sensing signal, drive the sensor electrodes with the sensing signals, and/or receive resulting signals from the sensor electrodes 125. For example, the sensor driver 140 includes an oscillator, one or more current conveyers and/or a digital signal generator circuit. Further, the sensor driver 140 includes driver circuitry including one or more amplifiers configured to drive the sensor electrodes 125 with the sensing signals. The sensor driver 140 includes receiver circuitry including one or more analog front ends, filters, and demodulators to receive and process resulting signals.

In one embodiment, the sensor driver 140 may simultaneously operate two or more of the sensor electrodes 125 for absolute capacitive sensing, such that a different resulting signal is simultaneously received from each of the sensor electrodes or a common resulting signal from two or more sensor electrodes. In another embodiment, some of the sensor electrodes 125 are operated for absolute capacitive sensing during a first period and others of the sensor electrodes 125 are operated for absolute capacitive sensing during a second period that is non-overlapping with the first period.

As illustrated in FIG. 1, the processing system 110 includes the determination module 141. The determination module 141 comprises circuitry, firmware, software, or a combination thereof. As will be described in greater detail in the following, the determination module 141 processes the resulting signals received by the sensor driver 140 to determine changes in capacitive couplings of the sensor electrodes 125. For example, the determination module 141 is configured to determine changes in a capacitive coupling between each modulated sensor electrode and an input object, such as input objects 145, from the resulting signals.

In various embodiments, different combinations of drivers and modules may be used. For example, the processing system 110 may include one or more drivers that operate hardware such as display screens. Further, the processing system 110 may include data processing modules for processing data such as sensor signals and positional information, and/or reporting modules for reporting information.

The processing system 110 may be implemented as an integrated circuit (IC) chip, or as one or more IC chips. In some embodiments, the processing system 110 may comprise a controller, or a portion of a controller, of the electronic device 100.

The processing system 110 may include a display driver (not shown) that is configured for updating a display of the display panel 120. In such an example, the processing system 110 may be referred to as including touch and display driver integration (TDDI) technology. In such embodiments, the processing system 110 may be implemented as a TDDI IC chip, or a portion of a TDDI IC chip.

In some embodiments, the processing system 110 responds to user input (or lack of user input) directly by causing one or more actions. Example actions include changing operation modes, as well as graphic user interface (GUI) actions such as cursor movement, selection, menu navigation, and other functions. In some embodiments, the processing system 110 provides information about the input (or lack of input) to some part of the electronic device 100 (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions. Further, in some embodiments, the processing system 110 is configured to identify one or more input objects 145, and/or a location of the input objects 145 within a sensing region of the electronic device 100. In some embodiments the processing system 110 is configured to identify one or more rotational changes of knob interface 150, or one or more changes of state of knob interface 150, or both, and map those changes to an input action.

The processing system 110 operates the sensor electrodes 125 to produce electrical signals (resulting signals) indicative of input (or lack of input) in a sensing region of the electronic device 100. The processing system 110 may perform any appropriate amount of processing on the electrical signals in producing the information provided to the electronic system. For example, the sensor driver 140 of the processing system 110 digitizes analog electrical signals obtained from sensor electrodes 125. As another example, the sensor driver 140 of the processing system 110 performs filtering or other signal conditioning. Further, the determination module 141 of the processing system 110 subtracts or otherwise accounts for a baseline, such that the information reflects a difference between the electrical signals and the baseline. The determination module 141 of the processing system 110 further determines positional information, recognizes inputs as commands, recognizes handwriting, recognizes fingerprint information, and/or distance to a target object, among others.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In embodiments where the sensor electrodes 125 are configured for display updating and capacitive sensing, the processing system 110 may be configured to generate a voltage signal to drive the sensor electrodes 125 during a display update interval during which the display of the display panel 120 is updated, and a sensing signal to drive the sensor electrodes 125 during an input sensing interval, respectively. In such embodiments, the voltage signal generated to drive the sensor electrodes 125 during a display update interval may be a substantially constant, or fixed voltage. The sensing signal generated to drive the sensor electrodes 125 during an input sensing interval may have a variable voltage. The value of a voltage signal to drive the sensor electrodes 125 during a display update interval may be predetermined. For example, the voltage value may be provided by a manufacturer of electronic device 100 and/or the sensor electrodes 125, and may be device-specific to electronic device 100. The processing system 110 may comprise circuitry to generate the voltage signal based on a clock signal, the output of the oscillator and/or the corresponding value of the voltage signal.

The display of the display panel 120 is updated during display frames. During each display frame, one or more display lines of the display may be updated. Multiple display update periods and non-display update periods may occur during each display frame of a plurality of display frames. During a display update period, one or more of the display electrodes of the display panel 120 may be driven to update the display of the display panel 120. During non-display update periods, one or more of the display electrodes of the display panel 120 may not be driven to update the display of the display panel 120. The non-display update periods may occur between pairs of display update periods of a display frame, at the start of a display frame, and/or at the end of a display frame.

The display panel 120 includes one or more display lines. Each display line corresponds to one or more subsets of the subpixels of the display panel 120. The one or more subsets may be connected to a common gate line of the display panel 120. Further, the subpixels may be updated during a common period. During each display update period, one or more display lines of the display panel 120 may be updated. The display frames may occur at a display frame rate. The display frame rate may be 30 Hz, 60 Hz, 120 Hz, or 240 Hz, among others. The sensor driver 140 or another driver of the processing system 110 may drive the display electrodes of the display panel 120 to update the display of the display panel.

The sensor driver 140 operates the sensor electrodes 125 for capacitive sensing during input sensing periods. The input sensing periods may occur during non-display update periods and/or display update periods. For example, one or more of the input sensing periods may be provided during a non-display update period that occurs between two display update periods of a display frame. In one embodiment, at least one input sensing period is as long as a display update period. In one embodiment, at least one input sensing period is longer than a display update period. In yet another embodiment, at least one input sensing period is the same as a display update period.

Acquiring the resulting signals over successive input sensing periods allows the rotation of the rotatable knob interface 150, as well as whether the rotatable knob interface 150 is in the home state or the compressed state, to be tracked.

As noted above, in one or more embodiments, an additional input apparatus may be provided on top of the display panel 120 of the electronic device 100, such as, for example, the rotatable knob interface 150, and may be electrically coupled to some or all of the sensor electrodes 125 that are positioned near or below it. In one or more embodiments, the additional input apparatus may provide alternate ways for a user to provide input to electronic device 100 other than touching, or hovering near, a display screen of the display panel 120 with an input device 145. In the depicted example of FIG. 1, the rotatable knob interface 150 is mounted onto the display panel 120, and may have a full (as shown in FIG. 1) or partial overlap with the display panel 120. As noted, in one or more embodiments the rotatable knob interface 150 may have a fixed base (not visible in the top view of FIG. 1) that is provided with various sets of coupling electrodes configured to couple with respective sets of sensor electrodes 125, such as one or more sets of the sensor electrodes 125 that are provided with sensing signals and one or more sets of electrodes that are provided with reference signals. In one or more embodiments, the fixed base may include different conductive regions respectively connected to corresponding sets of coupling electrodes.

The rotatable knob interface 150 may also include a rotary wheel that sits above, and rotates relative to, the fixed base. An underside of the rotary wheel may be, for example, patterned with various conductive and non-conductive regions, which may be configured to align with the conductive regions of the fixed base. Accordingly, there are various electrical couplings between the conductive regions of the fixed base and the various conductive and non-conductive regions of the rotary wheel. These components may be further configured such that these electrical couplings change as the rotary wheel is rotated. By detecting the effects of the changes in the electrical couplings by processing the resulting signals received on the display panel, the processing system 110 determines an amount of rotation, or an amount of change in rotation, of the rotatable knob interface 150. In one embodiment, the conductive and non-conductive regions are disposed within a peripheral region 152. In another embodiment, the various conductive and non-conductive regions may be part of one or more rings of the rotary wheel. A first ring may be referred as an outer ring and may be configured for rough (or coarse) tuning of the rotatable knob interface 150. A second ring may be referred to as an inner ring and may be configured for fine tuning of the rotatable knob interface 150. The first ring is disposed outside the second ring.

The peripheral region 152 may have numerous possible example arrangements of the conductive and non-conductive regions. Further, there may be various ways of having the rotary wheel and the fixed base electrically interact as the rotary wheel is rotated. Thus, alternate configurations and relative arrangements of both the conductive regions of the fixed base, and the placement of the conductive and non-conductive regions of the rotary wheel are possible, all being within the scope of this disclosure.

The rotation imparted to the rotatable knob interface 150 by a user, in either relative or absolute terms, may be detected by the electronic device 100. In one or more embodiments, the rotatable knob interface 150 may also be pressed downwards by a user, and may thus have two positions, a home, or "uncompressed" position, and a "compressed" position. The compressed position may be maintained by, for example, pushing down on the rotatable knob interface 150 against one or more biasing springs. In one or more embodiments, the rotatable knob interface 150 may have a cover. In alternate embodiments, the rotatable knob interface 150 may be pressed downwards so as to rest at multiple positions, and thus may have multiple states between an "uncompressed" and a "fully compressed" position. In the home position the cover is at a greater distance above the rotary wheel than in a compressed position.

The rotary wheel may have several switches provided between the rotary wheel and the cover. These switches may include the biasing springs. The rotatable knob interface 150 may be provided with one or more coupling electrodes 156 configured to couple to one or more of the sensor electrodes 125 of the input device that are also driven with sensing signals. In the example of FIG. 1, the coupling electrode 157 is connected to an inner ring provided in the fixed base, which aligns with a similarly shaped inner ring 153 that is provided in the rotary wheel. When a user presses down on the cover of the rotatable knob interface, so that the rotatable knob interface 150 is then in the "compressed" position, the switches close. For example, closing the switches may be defined as connecting the inner ring 153 of the rotary wheel with one or more of the conductive regions provided in peripheral region 152. This serves to electrically couple the coupling electrode 157 of the fixed base to coupling electrode 156 of the fixed base. The coupling electrode 156 is coupled with one or more sensor electrodes 125 that are driven with a reference signal. However, when the user ceases to press down on the cover, the coupling electrode 156 of the knob interface simply electrically floats. In various embodiments, direction and degree of rotation, as well as a user pressing down on, or ceasing to press down upon, the rotatable knob interface 150, may be interpreted by processing system 110, such as, for example, by determination module 141, and may be mapped to various user input actions, signals, or directives.

The rotatable knob interface 150 may be rotated in various ways. For example, the outer housing of the rotatable knob interface may be grabbed and turned, a top of the rotatable knob interface may be grabbed and turned, or a flange protruding from the side of the rotatable knob interface may be grabbed and turned. Further, one or more fingertips may be placed in on a recessed channel on an upper surface of the rotatable knob interface 150. Rotation of the rotatable knob interface 150 will be discussed in more detail in the following.

As is discussed above, the electronic device 100 of FIG. 1 may be provided in an automobile. For example, the display panel 120 may be vertically or horizontally oriented within a dashboard or center console of an automobile.

As illustrated in FIG. 1, one or more of the sensor electrodes 125 are not physically blocked by the rotatable knob interface 150. While performing capacitive sensing, the sensor electrodes 125 that are inside or are outside of region defined by the boundary 155 (described below), can both remain active. Thus, in such embodiments, both touches away from the rotatable knob interface 150, and rotations of the rotatable knob interface 150, are detected and reported by the processing system 110 at the same time.

In alternate embodiments, all other forms of user input besides those received via the rotatable knob interface 150 may be disabled on the electronic device. For example, the sensor electrodes 125 outside of the boundary 155 are not driven during the sensing interval to perform their capacitive sensing. As a result, if an input object 145 is moved into, or away from, its vicinity, no resulting signal is obtained, or if obtained, is not processed. This function may be implemented as a safety measure for example, to prevent a driver of an automobile from interacting with the display panel 120 while driving, by allowing the driver to only interact with the electronic device 100 via the rotatable knob interface 150. In such alternate embodiments, disabling of standard sensing functionality of one or more of the sensor electrodes 125 may be implemented during specified activities of the automobile, but not during others. For example, the standard sensing functionality of one or more of the sensor electrodes 125 may be disabled while the automobile is in actual motion. In this example, some of the sensor electrodes 125, for example, those not within specified proximity to the rotatable knob interface 150 to cause interference with signals acquired from the rotatable knob interface 150, may be operated normally to perform standard sensing, as described above. In some embodiments, one or more of the sensor electrodes 125, for example those near or beneath the rotatable knob interface 150, are disabled from performing capacitive sensing, while the remainder of the sensor electrodes 125 are operated to perform capacitive sensing. In such embodiments, the disabled sensor electrodes 125 may be selected based on their potential interference to the resulting signals obtained from the sensor electrodes 125 electrically coupled to the coupling electrodes of the rotatable knob interface 150. As is illustrated in FIG. 1, the sensor electrodes 125 within the region (area) defined by the boundary 155 may be referred to as being in a "blackout zone." The sensor electrodes 125 within the blackout zone may not be operated to perform capacitive sensing during a period when the sensor electrodes 125 outside the region defined by the boundary 155 are operated normally to perform capacitive sensing. As will be described in greater detail in the following, one or more of the sensor electrodes 125 within the blackout zone and electrically coupled to the rotatable knob interface 150 are driven so as to capture rotations, compressions, and/or other motions of the rotatable knob interface 150.

In the embodiments wherein all of the sensor electrodes 125 are disabled from standard sensing, pre-defined parameters may be used to provide input to the electronic device 100 via the rotatable knob interface 150, for example, using a pre-defined set of rotations and/or pressings of the rotatable knob interface 150. The resulting signals modified by the rotation and/or pressing are received by the processing system 110 during an input sensing period, which then interprets the resulting signals, for example, using determination module 141. The resulting signals may be the same signal as the sensing signal that sensor driver 140 drives the sensor electrode 125 with, after being modified by the capacitive coupling of the rotatable knob interface 150.

In general, within the blackout zone (e.g., the region of sensor electrodes 125 defined by the boundary 155), one or more of the sensor electrodes 125 are coupled to respective coupling electrodes 156-159 of the underside of the fixed base of the rotatable knob interface 150. In some embodiments, the coupling electrode 156 is driven with a reference signal, and the coupling electrodes 157-159 are driven with a sensing signal. Accordingly, a resulting signal modified by the relative rotational relationship of the fixed base and the rotary wheel of the rotatable knob interface 150 is generated. The sensor electrodes within the blackout zone identified by the boundary 155 may be disabled from standard capacitive sensing at all times. For example, the sensor electrodes within the blackout zone may perform capacitive sensing specifically related to the rotatable knob interface 150, and the sensor electrodes outside the blackout zone may perform capacitive sensing to detect one or more input objects 145 during normal operations.

The coupling electrodes 156-159 are illustrated in phantom as the coupling electrodes 156-159 are occluded by the fixed base of the rotatable knob interface 150. Further, the position and/or orientation of the coupling electrodes 156-159 with regard to the fixed base of the rotatable knob interface 150 may vary from that illustrated in FIG. 1. For example, various embodiments related to the position and orientation of coupling electrodes of the rotatable knob interface 150 are described in greater detail with regard to FIGS. 4A-4C.

As used herein, the term "disabled electrode" may refer to an electrode that is not driven at all, an electrode that is driven with a guard signal, or one that is driven with a constant voltage signal (e.g., a direct current (DC) voltage).

Continuing with reference to FIG. 1, as noted above, sets of sensor electrodes 125 are electrically coupled to the coupling electrodes 156-159 of the rotatable knob interface 150. Thus, during an input sensing period a reference signal is supplied by the sensor driver 140 to a first set of the sensor electrodes 125, and a sensing signal is supplied to second and third sets of the sensor electrodes 125. In one or more embodiments, the reference signal may be a configurable DC output provided by the processing system 110. In some embodiments, the DC signal may be a ground signal of the electronic device 100. In some embodiments, a resulting signal is obtained from each of the second and third sets of the sensor electrodes 125, where the resulting signals is the sensing signal as modified by the rotational state and/or compression state of the rotatable knob interface 150.

The resulting signals may be interpreted by the determination module 141 to determine a rotation of the rotatable knob interface 150. In one or more embodiments, the rotation may be determined in relative terms, such as a differential angular change from a prior position, or in absolute terms, such as a positive or negative angular change from a home position. In embodiments where the rotatable knob is turned more than 360 degrees, the overall rotational distance may also be measured. In such embodiments, one or more user commands may be mapped to absolute rotational distance. The user commands may correspond to controlling a graphical user interface (GUI) of an input device. For example, the user commands may include scrolling through a list of menu items presented on by the GUI. In alternate embodiments, only the one or both of overall angular change between starting position and ending position, or final absolute angular position, is measured. For example, the determination module 141 determines a final absolute angular position which may be related to a menu item presented by a GUI of an input device.

Figure 2:
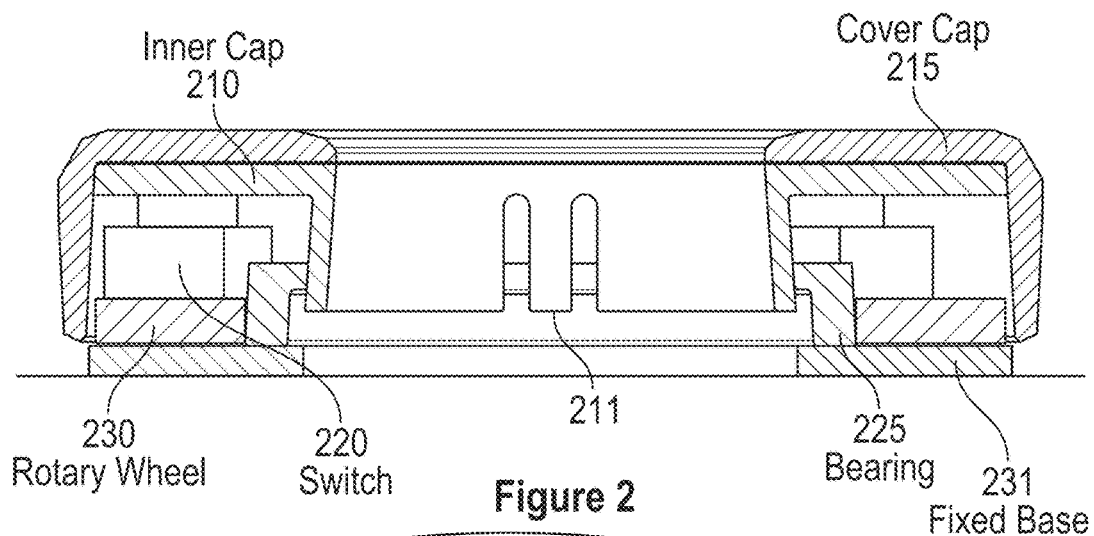
FIG. 2 illustrates a cross-sectional side view of an example rotatable knob interface, according to one or more embodiments.

FIG. 2 illustrates exemplary components of an example rotatable knob interface (e.g., the rotatable knob interface 150 shown in FIG. 1). With reference thereto, starting at the bottom of the example device, there is shown a fixed base 231. In some embodiments, the fixed base 231 does not move as the example knob interface is rotated. For example, the fixed base 231 may be affixed by, e.g., an adhesive, to a surface, e.g., a lens or encapsulation layer of the display panel 120 of electronic device 100. The fixed base 231 may be affixed in a temporary, semi-permanent or permanent manner, and may be placed thereon so as to align with a grid of the sensor electrode 125 provided in the electronic device 100.

Figure 3:
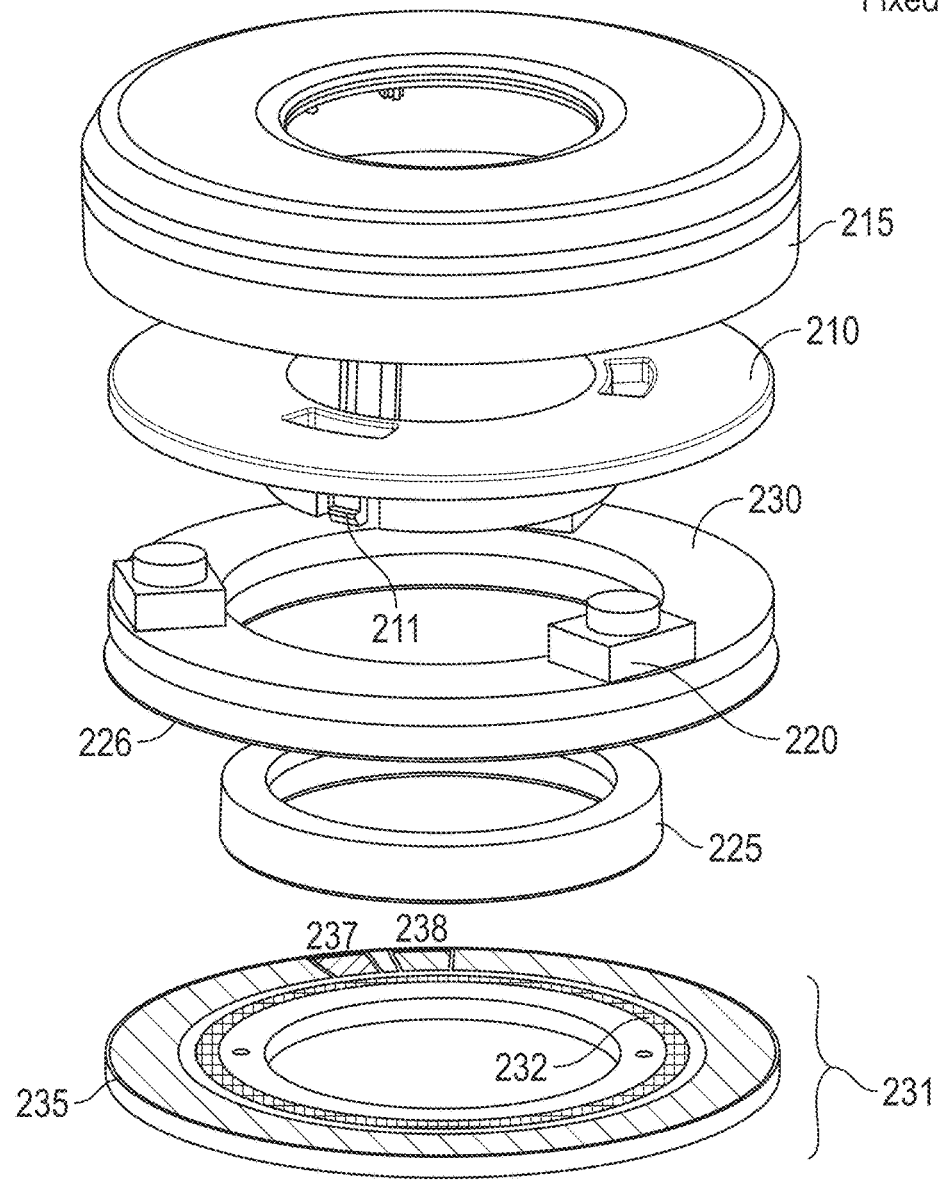
FIG. 3 illustrates an exploded view of the example rotatable knob interface of FIG. 2.

Provided above the fixed base 231 is a rotary wheel 230. The rotary wheel 230 turns as the rotatable knob interface 150 is rotated. For example, in response to the cover cap 215 being rotated, as is described below. At an inner side of the rotary wheel 230 is provided a vertical ring bearing 225. The vertical ring bearing 225 is non-conductive, and may be made of plastic or another non-conductive material, for example. An outer region of the vertical ring bearing 225 may have the shape of a ring. Further, the body of vertical ring bearing 225 may have a substantially tubular shape. Not shown in FIG. 2, but described below with reference to FIG. 3, is an additional substantially horizontal ring-shaped bearing upon which the rotary wheel 230 sits, according to one or more embodiments. By using both of the bearings, frictional forces between the fixed base 231, and the rotary wheel 230 may be reduced.

Continuing with reference to FIG. 2, provided on top of rotary wheel 230 are one or more switches 220. For example, switches 220 may be a combinations of dome switches, capacitive switches, and/or other suitable type of switches. There may be three switches 220, and the switches may be equidistantly placed on an upper surface of rotary wheel 230. In other embodiments, less than or more than three switches may be utilized. As described more fully below, in one or more embodiments, the switches 220 are used to distinguish between two or more states of the rotatable knob interface 150, namely a compressed state, in which the switches 220 are closed, and an uncompressed state, in which the switches 220 remain open. In other embodiments, the switches 220 may be used to distinguish more than two states of rotatable knob interface 150. For example, the switches 220 may be used to distinguish a compressed, uncompressed state, and one or more partially compressed states. In such embodiments, in the partially compressed states, the switches 220 are neither opened nor fully closed. Partially compressed, compressed, and open states may be determined based on corresponding measured changes in capacitive coupling caused by movement of a coupling electrode (e.g. the coupling electrode 157). In one embodiment, an open state may correspond to a measured change in capacitive coupling that corresponds to a lowest value, a closed state may correspond to a measured change in capacitive coupling that corresponds to a highest value, and a partially compressed state correspond to a measured change in capacitive coupling that corresponds to a value between the lowest value and the highest value. Multiple partially compressed states may be utilized. Each partially compressed state corresponds to a different measured change in capacitive coupling. In one embodiment, the determination module 141 compares the measured change in capacitive coupling to each of the values to determine the state of the rotatable knob interface 150. The compression state of the rotatable knob interface 150 is orthogonal to its internal rotational position. Thus, the rotatable knob interface 150 may be rotated while in either a compressed, a partially compressed, an uncompressed state (and in any position in between the states of the rotatable knob interface 150), and that rotation may be sensed and measured. Similarly, the state of the switches 220, corresponding respectively to the rotatable knob interface 150 being in the "home" or uncompressed state, or in the compressed state, or in a partially compressed state, may be detected whether or not the rotatable knob interface 150 is rotationally stationary or being rotated.

Finally, continuing still with reference to FIG. 2, the rotatable knob interface 150 has an inner cap 210, and a cover cap 215, as shown. In operation, a user physically interacts with cover cap 215, for example, by grasping cover cap 215 and rotating the rotary wheel 230 relative to the fixed base 231, or by pushing down on cover cap 215 to compress the knob interface and close one or more switches 220. As shown, the inner cap 210 is attached, by prongs 211, to a lip provided on the inner surface of vertical ring bearing 225. The cover cap 215 is attached to the inner cap 210, such that turning the outer cap 215 rotates the rotary wheel 230. In other embodiments, mechanisms other than the cover cap 215 and/or the inner cap 210 may be utilized to rotate the rotary wheel 230.

FIG. 3 illustrates an exploded view of one example of the rotatable knob interface 150 of FIG. 2, illustrating the upper side of various components. With reference to FIG. 3, beginning at the bottom of the figure, there is shown the upper surface of fixed base 231. The upper surface is provided with a conductive peripheral ring 235, to be coupled to a reference signal of an input device (e.g., provided by the processing system 110 of the electronic device 100) to which the rotatable knob interface 150 is to be attached. As shown, the upper surface also shows an inner conducting ring 232 as well as two conductive pads 237 and 238. These three conductive regions are configured to receive a sensing signal from one or more of the sensor electrodes 125. Details of these regions, their functions, and how they interact with the input device (e.g., the electronic device 100) upon which the rotatable knob interface 150 sits, are described in greater detail below.

Continuing with reference to FIG. 3, there are also shown the vertical ring bearing 225, and a horizontal ring-shaped bearing 226, configured to slide over the vertical ring bearing 225. In one or more embodiments, because the fixed base 231 has a smaller inner diameter than the rotary wheel 230, there is a ledge at the inner periphery of the fixed base 231 upon which the vertical ring bearing 225 may sit. The vertical ring bearing 225 is thus configured to fit inside the inner diameter of the horizontal ring bearing 226, and rest upon the inner periphery of the fixed base 231. The two bearings thus provide a physical interface between the fixed base 231 and the rotary wheel 230, as noted above, which reduces friction between them as the rotary wheel 230 is moved.

Continuing further with reference to FIG. 3, there are also shown three switches 220 provided around the upper surface of rotary wheel 230. Above the switches 220 is shown the inner cap 210, which is configured to fit inside the vertical ring bearing 225, and be secured to the vertical ring bearing 225 by means of three prongs 211, which, in one or more embodiments are also placed equidistantly around the inner vertical surface of the vertical ring bearing 225. As shown, the inner cap 210 has a substantially horizontal upper ring, and a lower hollow cylindrical shaped portion. Thus, in one or more embodiments, the outer diameter of the lower cylindrical shaped portion of the inner cap 210, may fit within an inner diameter of the vertical ring bearing 225, and then clamp to the bottom surface of the vertical ring bearing 225 by the prongs 211, which slightly protrude under such bottom surface when the inner cap 210 is in the home or uncompressed position. Finally, with reference to FIG. 3, the cover cap 215 is attached to the upper ring portion of the inner cap 210, as shown.

Figure 4A:
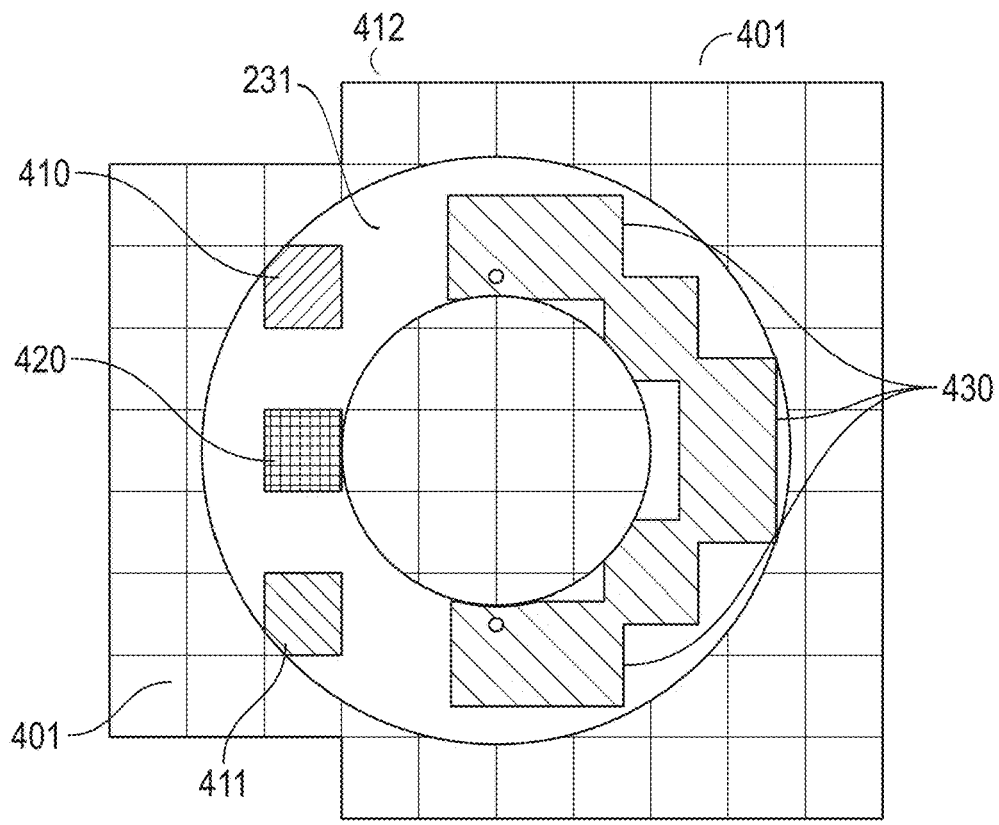
FIG. 4A illustrates an underside view of the fixed base of an example rotatable knob interface as shown in FIG. 3 with a first set of reference electrodes, and two sets of coupling electrodes according to one or more embodiments.
Figure 4B:
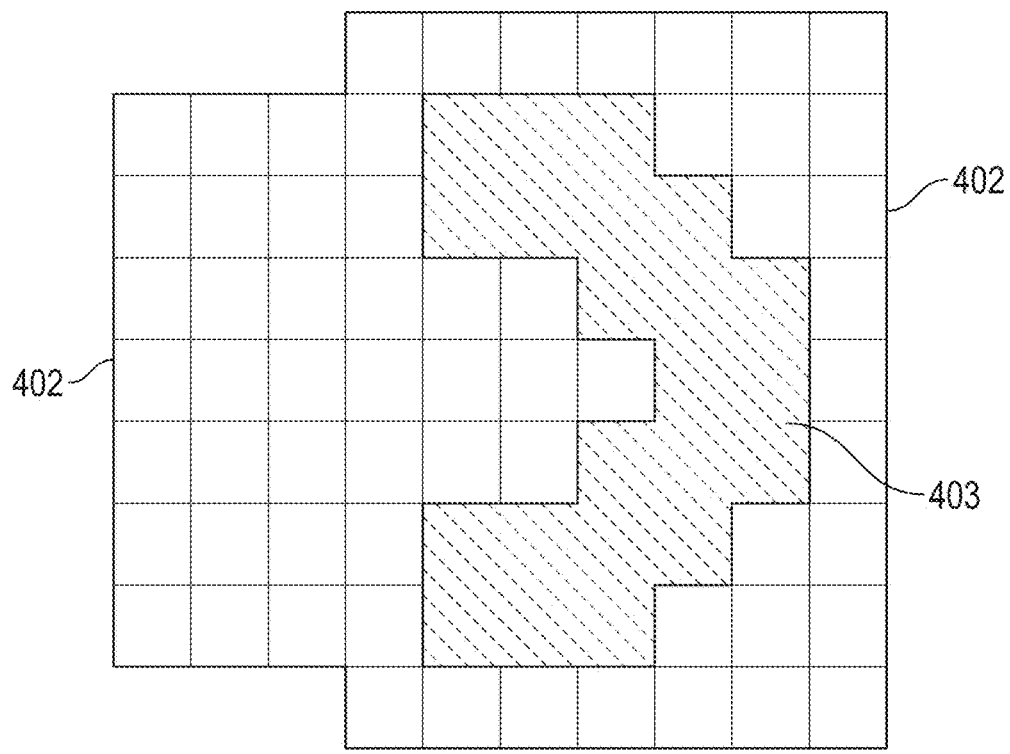
FIG. 4B illustrates an example portion of an input device illustrating a grid of sensor electrodes, the grid of sensor electrodes configured into two sets of sensor electrodes, according to one or more embodiments.
Figure 4C:
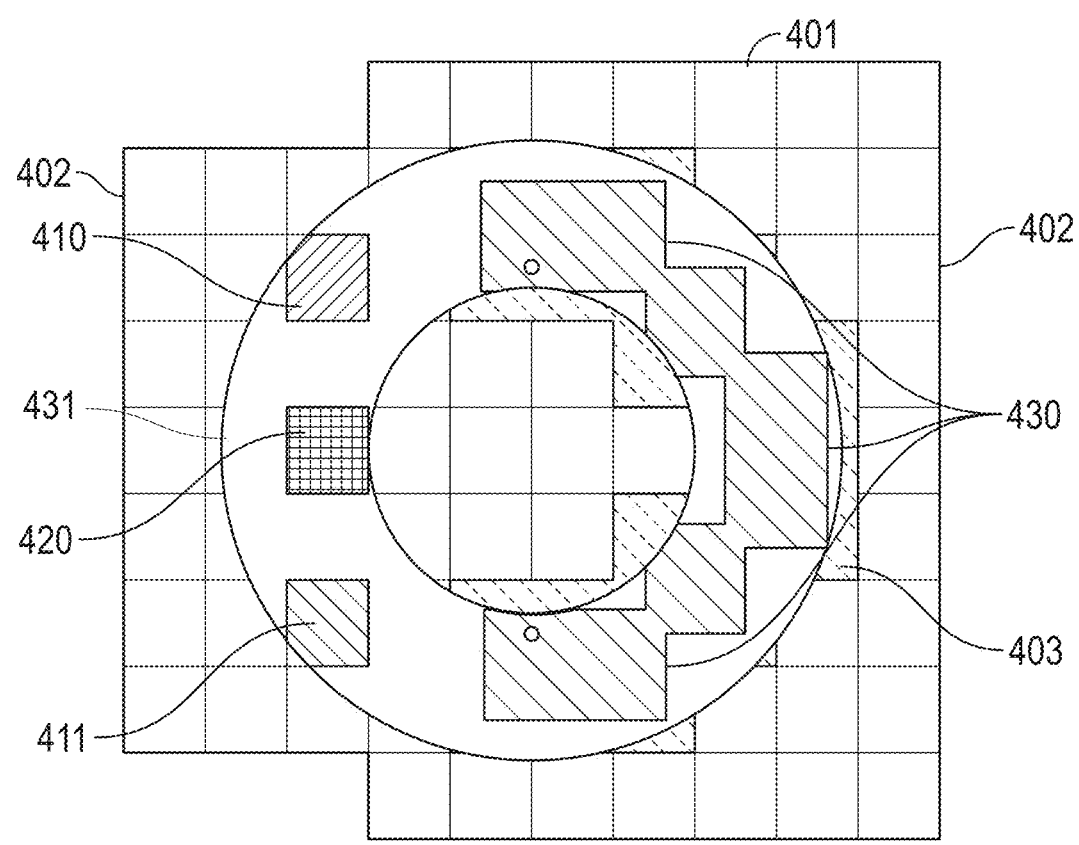
FIG. 4C illustrates the fixed base of an example rotatable knob interface of FIG. 4A as positioned over the example grid of sensor electrodes of FIG. 4B, according to one or more embodiments.

FIGS. 4A through 4C, next described, illustrate the spatial relationships between coupling electrodes provided on the bottom surface of the fixed base 231, respectively connected to corresponding conducting regions on the top surface of the fixed base 231, and the sensor electrodes 125.

FIG. 4A illustrates a view of the underside of the fixed base 231 of the rotatable knob interface 150, superimposed over a grid 401 of the sensor electrodes 125, according to one or more embodiments. The grid 401 may correspond to the blackout zone defined by the boundary 155 of FIG. 1. Further, in other embodiments, the grid 401 may correspond to other configurations of the sensor electrodes 125. With reference thereto, the bottom, or underside, of fixed base 231 has three sets of electrodes. A first set of electrodes 430, shown as shaded, is a contiguous set of electrodes configured to receive a reference signal from one or more of the sensor electrodes 125. Three electrodes 410, 420, 411, grouped into the remaining two sets, are configured to receive a sensing signal from one or more of the sensor electrodes 125. The second set, including electrodes 410 and 411, is configured to sense rotation of the rotatable knob interface 150. The third set, including electrode 420, is configured to sense a "click" or the closing of the switches 220, for example, when the rotatable knob interface is placed in the compressed state. As shown, each of the coupling electrodes 410, 411 and 420 may at least partially overlap with, one or more sensor electrodes 125 of the grid 401. On the other hand, the set of electrodes 430 may each overlap at least portions of multiple sensor electrodes 125 of grid 401, such that the set of electrodes 430 acquire a signal from the corresponding reference sensor electrodes 403 (see FIG. 4B) on the grid 401 on the upper surface of the example input device (e.g., the electronic device 100), and any effect of a parasitic capacitance from neighboring sensor electrodes 125 is mitigated. The sensor electrodes 125 of the region 402 exclude the sensor electrodes 125 of the region 403. For example, the sensor electrodes 125 of the region 402 include the sensor electrodes disposed proximate to the coupling electrodes 410, 411, and 420 and external to the sensor electrodes of the region 403. This isolation is illustrated in FIG. 4A by two features. First, there is an empty column 412 of sensor electrodes to the right of the coupling (or sensing) electrodes 410, 411 and 420 that provides a gap between the coup electrodes 410, 411 and 420, and the set of electrodes 430. Second, the set of electrodes 430 (full line shading) are each recessed inwardly relative to the reference electrodes 403 (shaded with dotted lines in FIG. 4B). The set of electrodes 430 may be recessed by about 1.5 mm to about 2 mm. However, in other embodiments, the set of electrodes 430 are recessed by less than about 1.5 mm or more than about 2 mm. This recessing may help the set of electrodes 430 to sense the reference electrode signal and minimize sensing the parasitic coupling of nearby sensing signals on the sensor electrodes 125. Further, the recess may help tolerance alignment of the example rotatable knob interface 150 to the electronic device 100. In other embodiments, including the empty column 412 of sensor electrodes or recessing the electrodes 430 as is described above provides sufficient isolation of the set of electrodes 430 to mitigate the effects of the parasitic capacitance from neighboring sensor electrodes 125 on the set of electrodes 430.

FIG. 4B illustrates the example grid 401 of FIG. 4A divided into two groups of the sensor electrodes 125, according to one or more embodiments. Each group of the sensor electrodes 125 may be driven with a different signal. For example, the sensor electrodes 125 in region 403 may be driven with a sensing signal while the sensor electrodes 125 in region 402 are driven by a reference signal. In general, each of the sensor electrodes 125 may be selectively driven with a sensing signal or a reference signal, such as, for example, ground, or other reference signal. In one or more embodiments, to coordinate the sensor electrodes 125 of the grid 401 with the electrodes of the underside of a fixed base 231, as shown in FIG. 4A, the grid 401 of the sensor electrodes 125 is arranged as shown in FIG. 4B. Thus, the sensor electrodes 125 of the region 403 of the grid 401, shaded in FIG. 4B, may be driven with a reference signal, and sensor electrodes 125 outside the region 403 may be driven by with a sensing signal. Accordingly, there is an electrical pairing (e.g., electrical or capacitive coupling) between the underside of the fixed base 231, and the sensor electrodes 125 of the grid 401. This is illustrated in the superimposed view of FIG. 4C.

FIG. 4C illustrates the underside of fixed base 231 of FIG. 4A as positioned over the sensor electrodes of the grid 401 of FIG. 4B, according to one or more embodiments. As shown, the coupling (or sensing) electrodes 410, 411 and 420, configured for sensing on the rotatable knob interface 150, are aligned with one or more of the sensor electrodes 125, such that the coupling electrodes 410, 411, and 420 are driven with a sensing signal via a capacitive coupling between the coupling electrodes 410, 411, and 420 and the one or more sensor electrodes 125. In one embodiment, they are driven with the same sensor electrodes 125. Similarly, the set of electrodes 430, configured for coupling to a reference signal of the processing system 110, are each provided above multiple sensor electrodes 125 of the region 403, to be driven with a reference signal by the processing system 110. In one or more embodiments, because the fixed base 231 is stationary, and fixed in position relative to the input device, the fixed based is first aligned to the sensor electrodes 125 of the input device, as shown, and then, in one or more embodiments, permanently attached to a surface of the electronic device 100.

Figure 5:
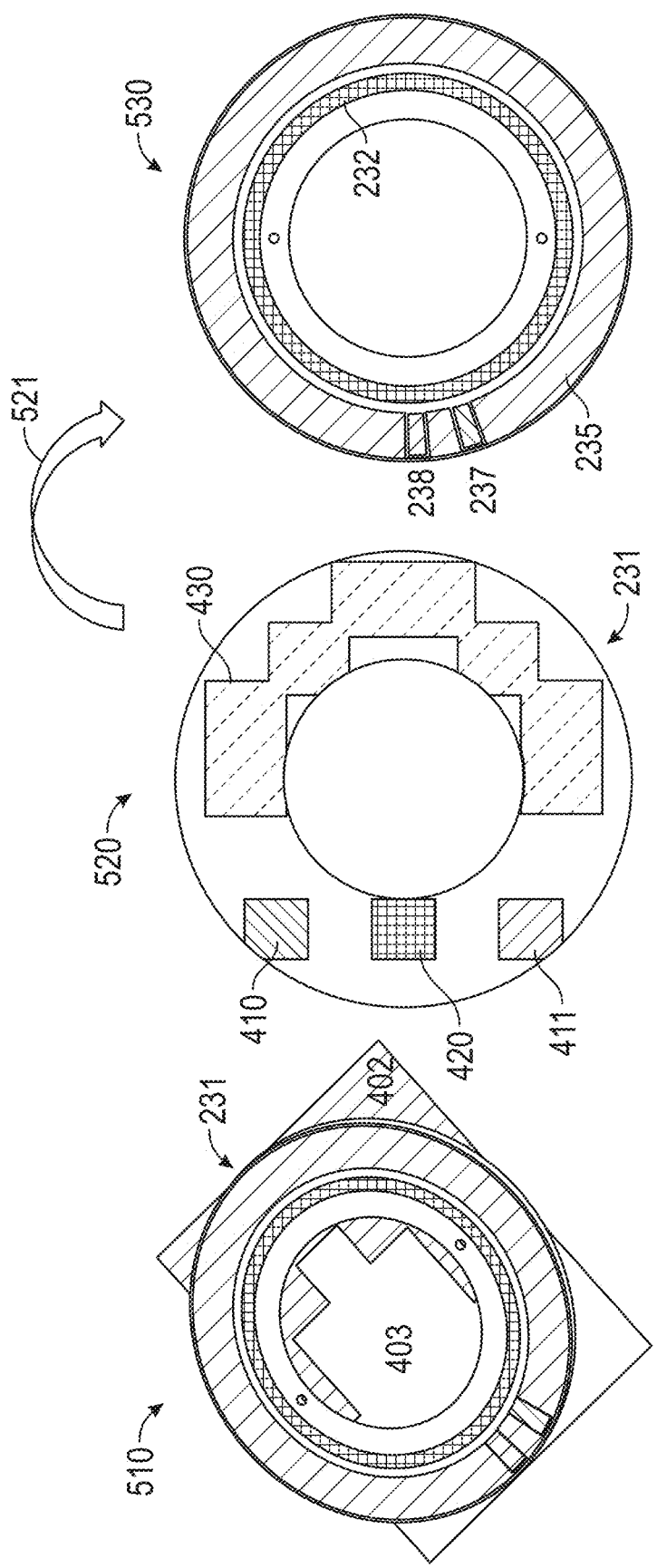
FIG. 5 illustrates a perspective top view, a bottom view and a top view of the example fixed base of FIGS. 3 and 4A through 4C, according to one or more embodiments.

Next described, with reference to FIG. 5, is the upper surface of the fixed base 231. With reference thereto, there is shown top perspective view 510, which illustrates the positions of electrode regions corresponding to the sensor electrodes 125 of the regions 402 and 403 relative to the top surface of the fixed base 231, according to one or more embodiments. As shown in the top perspective view, as well as by comparing bottom surface view 520 with top view 530, the top surface of the fixed base 231 is somewhat differently organized than its bottom surface. To fully appreciate the relative positions of conductive pads on the top and bottom surfaces, bottom surface view 520 is also shown, and, as indicated by the curved arrow 521, a corresponding position of the top surface is also shown, at top view 530. This top view 530 is what would be seen if the fixed base 231 as shown in bottom surface view 520 was flipped about a horizontal axis (such that right and left sides of the fixed base 231 are the same in views 520 and 530, respectively). Continuing with reference to FIG. 5, top view 530 illustrates four conductive regions, namely inner conductive ring 232 (used to sense whether the switches are open or closed), the two conductive pads 237 and 238 (used to sense rotation) and peripheral ring 235. In one or more embodiments, each of these is electrically connected by vias to a corresponding conductive region on the bottom surface of fixed base 231. In particular, peripheral ring 235 is electrically connected to corresponding set of electrodes 430, as noted above, to couple to the sensor electrodes 125 driven with a reference signal; the two conductive pads 237 and 238 are respectively connected to coupling electrodes 410 and 411; and inner conductive ring 232, is electrically connected to sensing electrode 420. In some embodiments, as noted above, both conductive pads 237 and 238, as well as inner conductive ring 232 are configured to couple to the sensor electrodes 125 that are driven with a sensing signal.

Thus, in the embodiment shown, the top of fixed base 231 has, on its outer periphery, two small conductive pads 237 and 238 near each other, surrounded by a peripheral ring 235. The peripheral ring 235 receives a reference signal, and the two pads 237 and 238 each receive a sensing signal. The two pads are used to sense rotation. A second, the inner conductive ring 232 inside of the peripheral ring 235 is configured to also receive a sensing signal to sense whether the switches are closed. The closing of the switches may also be referred to as a "click" from the sound they make when they close.

Figure 6A:
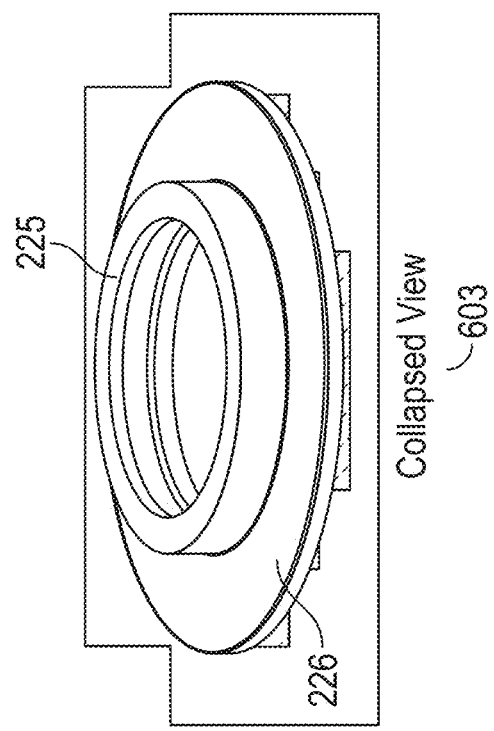
FIG. 6A illustrates exploded and collapsed views of the example fixed base and example plastic bearings shown in FIG. 3.
Figure 6A:
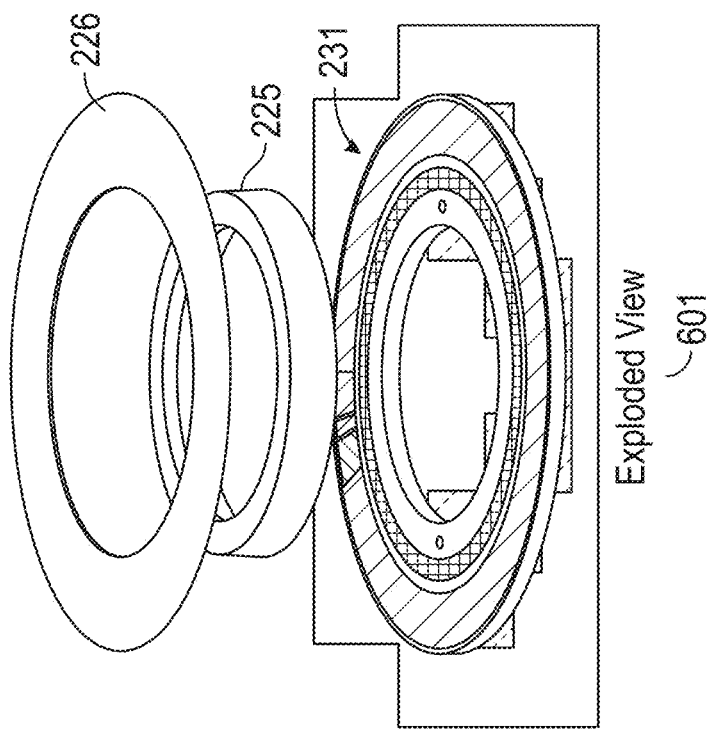

FIG. 6A illustrates exploded view 601 and collapsed view 603 of the example fixed base 231 and example vertical ring bearing 225 and horizontal ring bearing 226 (e.g., plastic bearing) shown in FIG. 3. As these elements have been previously described, they are not described again here. What is noted is, in one or more embodiments, as is shown in collapsed view 603, horizontal ring bearing 226 has a smooth surface on top of which the rotary wheel 230 can rest, and vertical ring bearing 225 has a smooth outer cylindrical structure around which the rotary wheel 230 can turn.

Figure 6B:
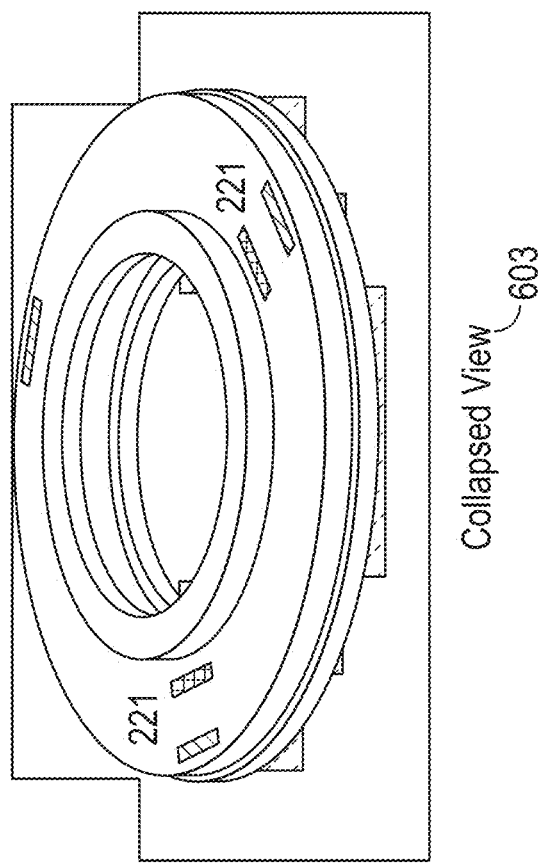
FIG. 6B illustrates the respective exploded and collapsed views shown in FIG. 6A, with the addition of the example rotary wheel of FIG. 3 provided on top of an example flat ring-shaped bearing.
Figure 6B:
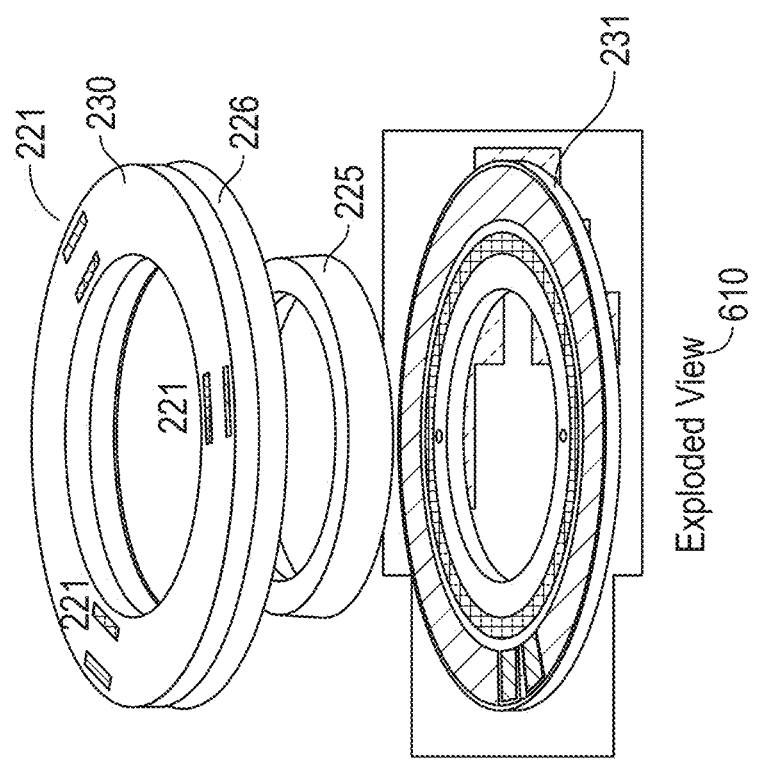

FIG. 6B illustrates the respective exploded view 610 and collapsed view 603 of the of the example fixed base 231 and bearings 225, 226 shown in FIG. 6A, with the addition of the example rotary wheel 230 of FIG. 3 provided on top of an example flat ring-shaped bearing 226. As shown, the vertical ring bearing 225 has a larger height than that of the rotary wheel 230, such that it protrudes above the rotary wheel 230. Visible in each of exploded view 610 and collapsed view 603, are three sets of pads 221 provided on a top surface of the rotary wheel 230 for connection to the set of switches (not shown). This is described in greater detail below, after the organization of the bottom surface of the rotary wheel 230 is described.

Figure 7A:
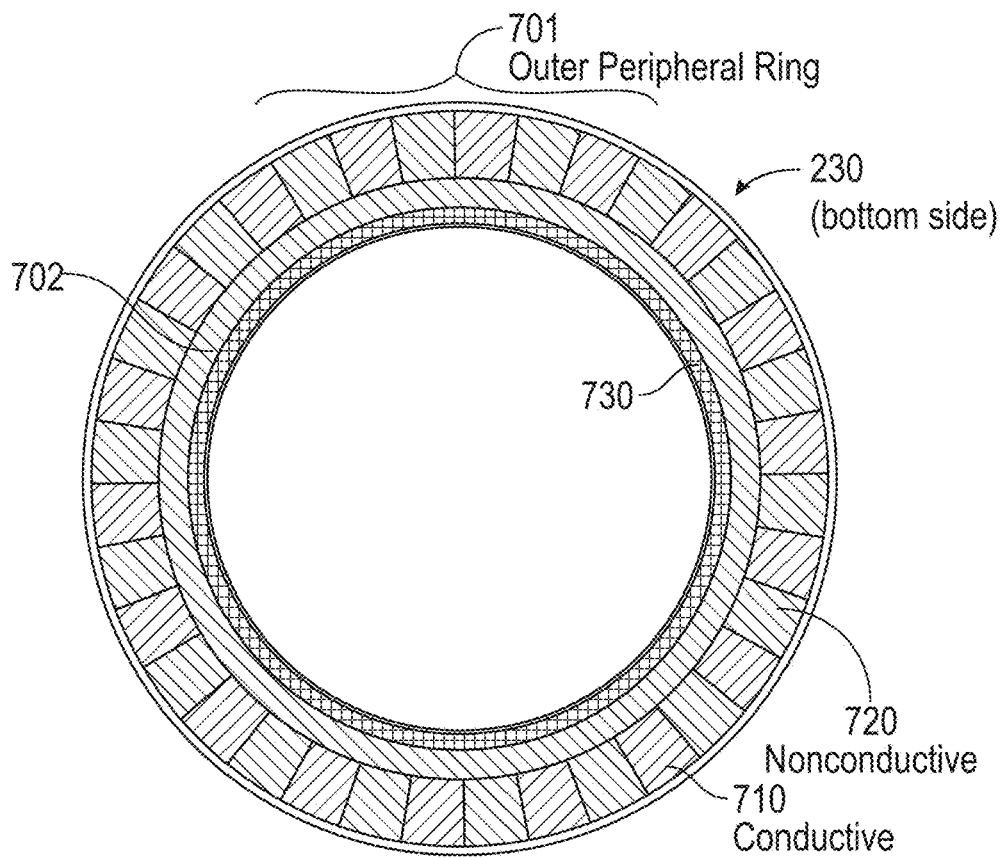
FIG. 7A illustrates a detailed bottom view of the rotary wheel of FIG. 3, according to one or more embodiments.

FIG. 7A illustrates a detailed bottom view of the rotary wheel 230 of FIG. 3. With reference thereto, as in the case of the top surface of the fixed base, there are essentially two ring shaped structures. An outer peripheral ring 701 which comprises alternating first conductive regions 710 and non-conductive regions 720, and an inner ring which comprises a single connected second inner ring (e.g., conductive region) 730, according to one or more embodiments. Additionally, the ring-shaped region 702, provided between the outer peripheral ring 701 and the inner ring 730, is also non-conductive. In one or more embodiments, first conductive regions 710 are used to sense rotation, and inner ring 730 is used to sense "click."

Figure 7B:
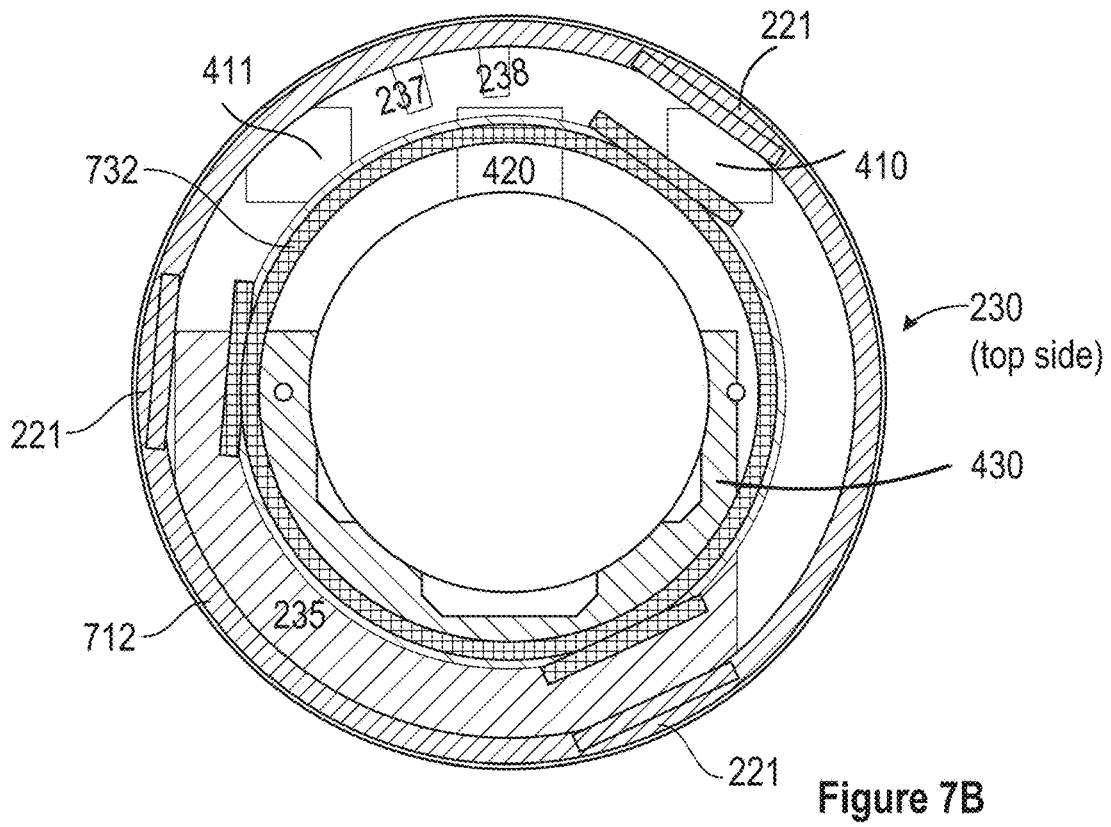
FIG. 7B illustrates a detailed top view of the rotary wheel of FIG. 7A, according to one or more embodiments.

FIG. 7B illustrates a detailed top view of the example rotary wheel of FIG. 3. The view of FIG. 7B corresponds to the view of the top surface of rotary wheel 230 shown in FIG. 6B that illustrates three sets of pads 221 which each respectively connect to a switch. The top view of FIG. 7B is drawn transparently, to show the underlying conducting rings to which each set of pads 221 is respectively coupled, as well as the other conductive regions on the bottom and top surfaces of the fixed base 231, previously described. These include, as shown here via the transparency, and as shown in FIG. 4A, on the bottom surface of the fixed base 231, the coupling electrodes 410, 420 and 411 and the set of electrodes 430 that is coupled to a reference signal of the processing system 110; and on the top surface of the fixed base 231, a portion of the peripheral ring 235, and the conductive pads 237 and 238.

The conductive regions 710 of FIG. 7A, as well as the conductive pads 237 and 238, and the peripheral ring 235 of FIG. 7B, may be made of known conductors, such as, for example, copper, silver, gold, aluminum, indium tin oxide, or other conductors, or, for example, various alloys of any of those, with each other, or with different elements or compounds. In one embodiment, the non-conductive regions 720 may be regions of a printed circuit board or substrate on which no metal is deposited, and thus be made of epoxy plastic and fiberglass, for example. In another embodiment, the non-conductive regions 720 may be formed by depositing an insulating layer such as, for example, a silicon dioxide ($SiO_2$) layer.

As shown in FIG. 7B, there are two ring shaped conductive regions, namely the outer ring region (e.g., the conducting ring 712) and the inner ring region 732, for example, provided just under the surface of the top side of the rotary wheel 230. The outer ring region (e.g., the conducting ring 712) is electrically connected to each of the first conductive regions 710 on the bottom side of the rotary wheel 230, as shown in FIG. 7A, by vias (not shown). Similarly, the inner ring region 732, provided on the inner periphery of the top side of the rotary wheel 230, is electrically connected to the second conductive inner ring region 730 on the bottom side of the rotary wheel 230, also shown in FIG. 7A, by vias (not shown). Additionally, in the depicted example of FIG. 7B, while the positions of the three sets of pads 221 to which the three switches 220 are to be connected are shown, the switches are not shown. Thus, when the switches 220 are closed, by a user pushing down on the cover cap 215 (shown in FIGS. 2 and 3) until the switches 220 make a clicking sound or an equivalent other indication, the inner portion of each pad is electrically connected to the outer portion of each pad, which causes the regions corresponding to the conducting rings 712 and 732 to be electrically connected. This also may cause, with reference to FIG. 7A, the respective first conductive regions 710 to be connected to the inner ring region (e.g., a second conductive region) 732. It is noted that there may be more or less switches, and corresponding sets of switch pads to which they connect, in alternate embodiments. The pads 221 may be referred to as switch pads, and may be placed equidistantly around the rotary wheel 230, as shown. In some embodiments the switches 220 may have more than two states, and thus have more positions than "compressed" or closed, and "uncompressed" or open." In such embodiments, the switches 220 may have one or more intermediate states between "compressed" and "uncompressed", and a user may push down on the cover cap 215 to move between an "uncompressed" or fully open state, and each of the intermediate states and the fully closed state. In such embodiments, each position of the switch 220 may be sensed, such as, for example, by signal strength of the electrical coupling at each state of the switch.

Figure 8:
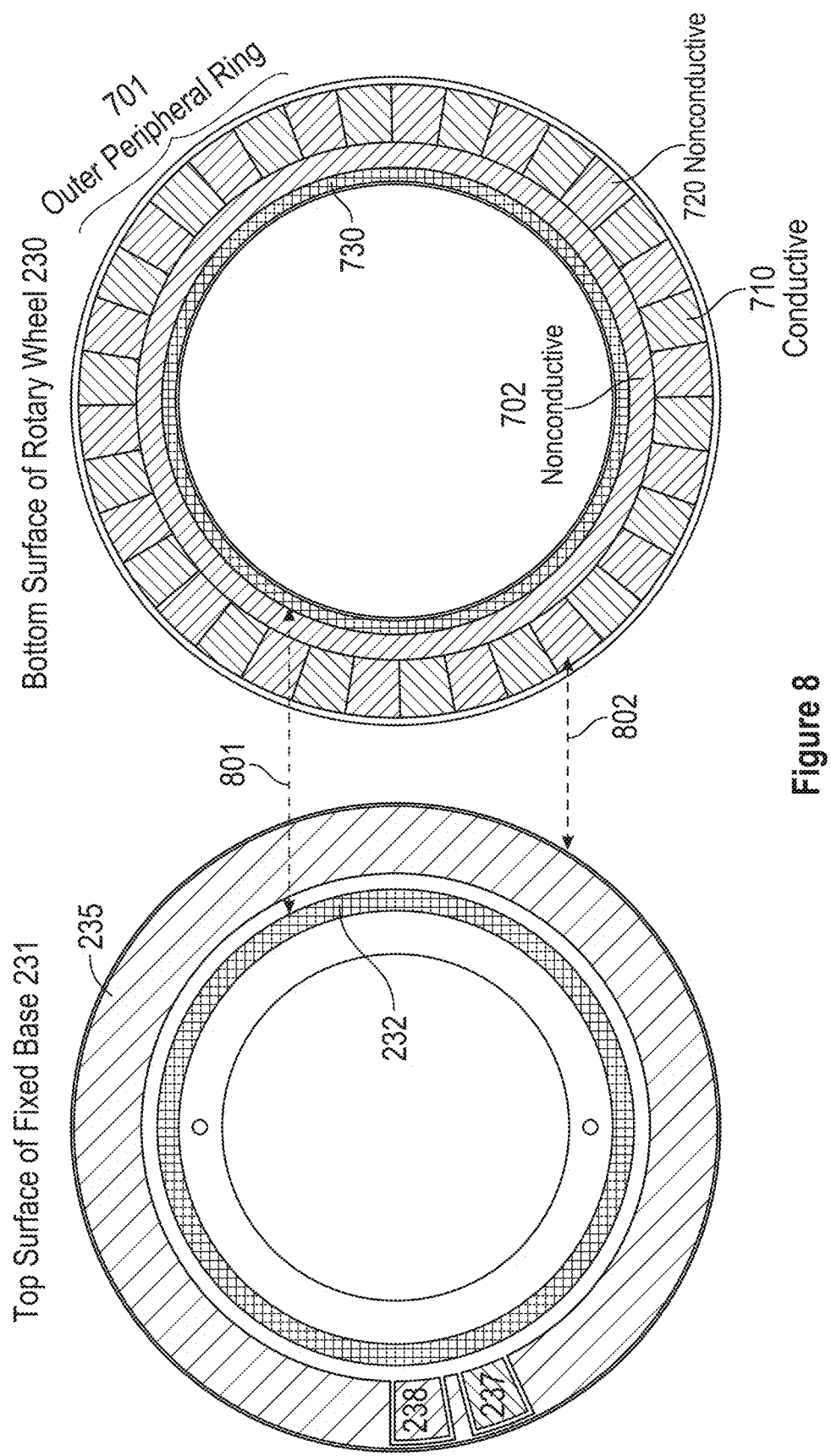
FIG. 8 depicts the top view of the example fixed base, and the bottom view of the example rotary wheel, as shown in FIGS. 5 and 7A, respectively, and capacitive coupling between them, according to one or more embodiments.

Given the descriptions above of the respective top and bottom surfaces of each of fixed base 231 and rotary wheel 230, the dashed arrows 801 and 802 of FIG. 8 illustrate the electrical coupling between the top surface of the fixed base 231 and the bottom surface of rotary wheel 230. The top surface of the fixed base 231 faces the bottom surface of the rotary wheel 230 in the assembled rotary knob interface 150, when the rotary wheel 230 sits above the fixed base 231. With reference thereto, dashed arrow 801 depicts the electrical coupling between the inner conductive ring 232 of the top surface of the fixed base 231 and the inner ring 730 of the bottom surface of the example rotary wheel 230. Additionally, dashed arrow 802 depicts the electrical coupling between peripheral ring 235 of the top surface of the example fixed base 231, which includes conductive pads 237 and 238, and the various conductive regions 710 of the outer peripheral ring 701 of the bottom surface of the example rotary wheel 230. As noted above, the regions 720 of the outer peripheral ring 701 of the bottom surface of the rotary wheel 230 are non-conductive. Further, the non-conductive divider ring 702 is non-conductive, and is provided between the outer peripheral ring 701 and the inner ring 730.

As shown in FIG. 8, when the rotary wheel 230 sits above the fixed base 231 (with the horizontal bearing between them), there may be various electrical couplings between their respective peripheral ring regions. The peripheral ring 235 is coupled to a reference signal driven by the processing system 110 via the set of electrodes 430. Further, the peripheral ring 235 is capacitively coupled to one or more of the conductive regions 710 of the underside rotary wheel 230. Whether one or both of the conductive pads 237, 238 are coupled to the conductive pads 710 of the underside of the rotary wheel 230 depends upon the relative rotational position of the rotary wheel 230 and the fixed base 231.

To sense rotation, the two conductive pads 237 and 238 on the top surface of fixed base 231 are coupled to sensor electrode 125 that are respectively driven with sensing signals by the processing system 110. As noted above with reference to FIG. 4A, the conductive pads 237 and 238 on the top surface of fixed base 231 are respectively electrically connected by vias with the coupling electrodes 410 and 411 provided on the bottom surface of the fixed base 231. In turn, the coupling electrodes 410 and 411 are coupled to corresponding sensor electrodes 125 that are driven with sensing signals, as shown, for example, in FIG. 4C. By driving the sensor electrodes 125 that are respectively coupled to the fixed base coupling electrodes 410 and 411 with sensing signals, the resulting signals that are received by those sensor electrodes vary as a function of the capacitive coupling of each of the two conductive pads 237 and 238 on the top surface of fixed base 231 with the array of conductive region 710 and non-conductive regions 720 on the bottom surface of the rotary wheel 230.

FIGS. 9A through 14, described below, illustrate various enhancements to, or alternate functionalities of, the rotatable knob interface described above with reference to FIGS. 1-8. It is noted that in one or more embodiments, some, or many, of the enhancements and alternate functionalities may be combined in any given example device.

Figure 9B:
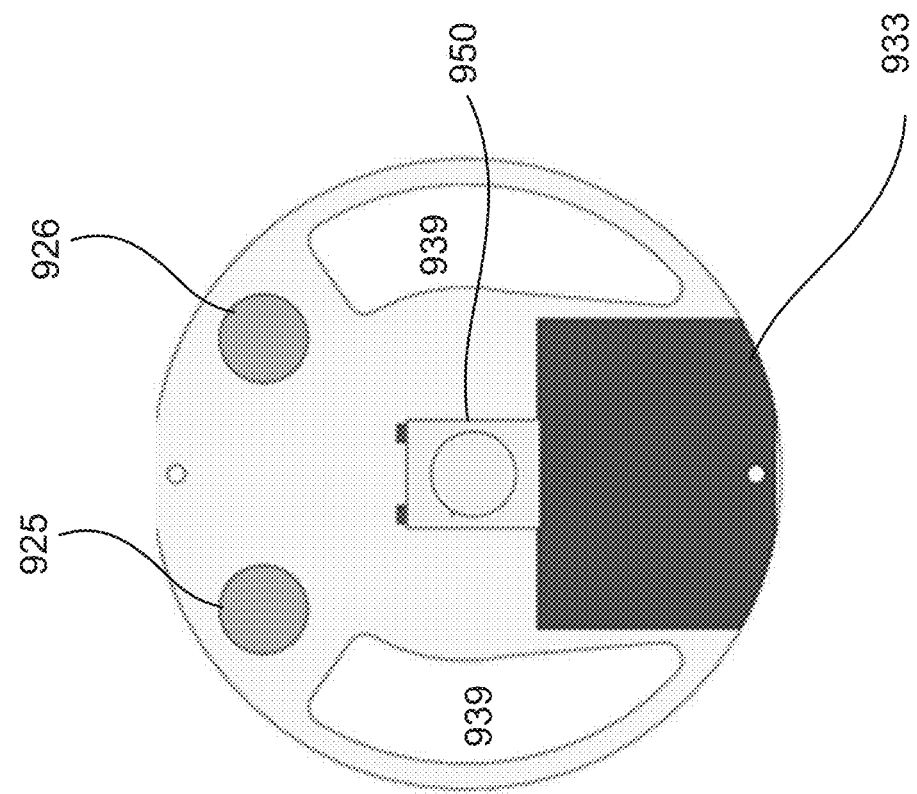
FIG. 9B depicts a top view of the alternate fixed base of FIG. 11A according to one or more embodiments.
Figure 9A:
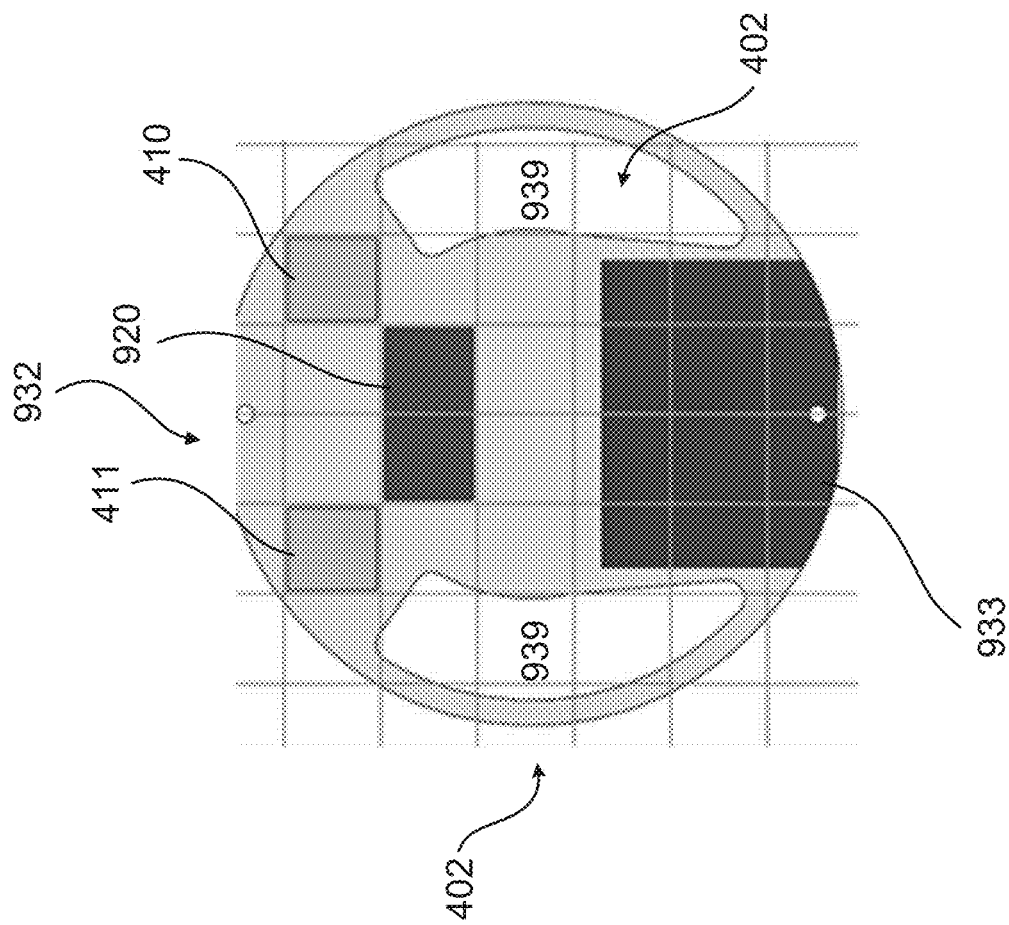
FIG. 9A depicts an underside of an alternate fixed base, according to one or more embodiments.

FIGS. 9A and 9B illustrate an alternate approach to sensing click, or mechanical response functionality, of a rotatable electronic device. In this example approach, click sensing may be facilitated on the fixed base of the rotary electronic device. This is in contrast to the approach described above with reference to FIG. 2, where the rotary wheel 230 is provided with three example switches 220 on its upper surface. When, in the example of FIG. 2, switches 220 are closed, the two conducting ring regions 712 and 732, as shown in FIG. 7B, are electrically connected, which is then sensed by the processing system 110.

In embodiments where the rotatable electronic device does not include a central hole in the fixed base, switches that effect click sensing do not need to be capacitively routed to the rotary wheel. As a result, these switches may be provided on the fixed base. FIG. 9A shows underside of an alternate fixed base 932 provided with a click sensing pad 920. FIG. 9B, in which the top view of the alternate fixed base 932 is depicted, shows a dome switch 950 that connects the grounded region 933 to the click sensing pad 920. Grounded region 933 is conductive, and thus if multiple electrodes on a surface of an input device are coupled to it, those electrodes become electrically coupled to each other. This fact is leveraged in the example shift detection methods described below in connection with FIGS. 12A, 12B and 13. It is here noted that alternate fixed base 932 allows for an increased signal for sensing the click and reduces the complexity of routing the click functionality to the rotary wheel. FIGS. 9A and 9B also show two kidney shaped apertures 939 on either side of fixed base 932. Apertures 939 may improve signal integrity in the following way. As shown in FIG. 9A and in FIG. 4B, fixed base 932 may be provided above a group of sensor electrodes 402 on an upper surface of an example input device that are driven with a sensing signal. Additionally, above fixed base 932 may be provided the rotary wheel 230, shown in FIGS. 7A and 7B. On the bottom side of the rotary wheel 230, as further shown in FIG. 7A, there may be provided conductive regions 710. Thus, fixed base 932 is "sandwiched" in between sensor electrodes 402 on an upper surface of an input device, and the conductive regions 710 on the bottom side of the rotary wheel 230. Apertures 939 on fixed base 932 may reduce parasitic capacitance between the conductive regions 710 on the underside of rotary wheel 230 and the electrodes 402 on the input device. Capacitance may be calculated based upon the overlapping areas of the two regions of interest, the distance between them, and the dielectric between the two regions. Apertures 939 introduce air, which has a dielectric constant of 1, as the dielectric medium in between sensing electrodes 402 and conductive regions 710. This is instead of plastic, or, for example, FR4 (a composite material made of woven fiberglass cloth with an epoxy resin binder that is flame resistant), which are materials an example fixed base 932 may be made of. Because plastic and FR4 each have a significantly higher dielectric constant than air, the air gap provided by apertures 939 may thus reduce the parasitic capacitance between the conductive regions 710 on the bottom side of the rotary wheel and sensing electrodes 402.

In alternate examples, apertures 939 may have different shapes, or may not be used at all.

Figure 10:
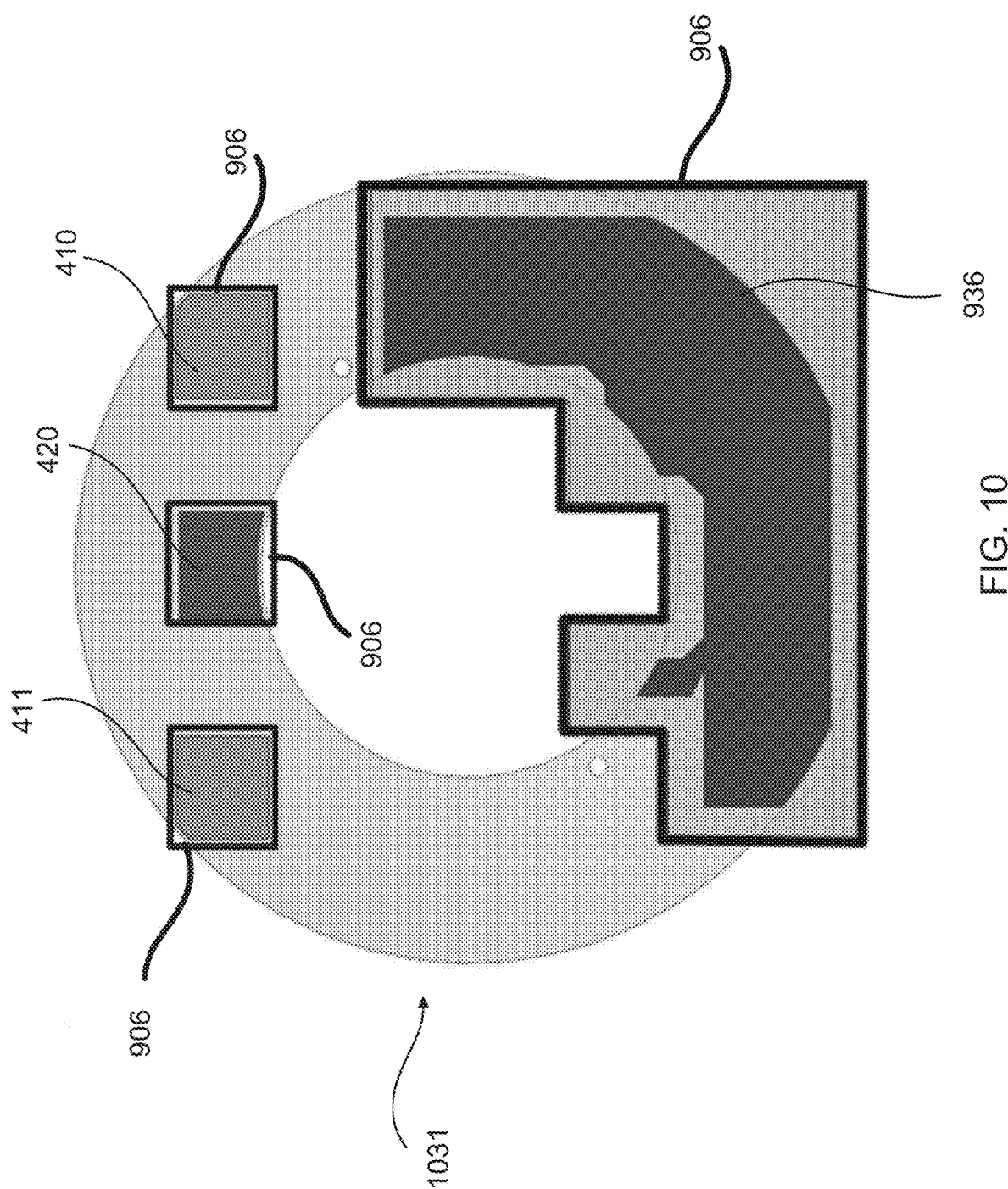
FIG. 10 illustrates a bottom view of an example fixed base with outlines around regions to be attached with a conductive adhesive, according to one or more embodiments.

FIG. 10 illustrates a bottom view of an example fixed base 1031. Example fixed base 1031 is similar to fixed base 231 of FIG. 4A, but the grounded region 936 is somewhat larger, and has a different shape. FIG. 10 also depicts outlines 906 drawn around regions of the underside of fixed base 1031 to be attached to a display panel (not shown), with a conductive adhesive, according to one or more embodiments. As an alternative to attaching the fixed base to the display panel using a non-conductive adhesive, conductive adhesives may be used for selected regions to improve the signal by increasing the coupling of the fixed base sensing pads 410, 411, 420, and fixed base grounded region 936, respectively, to the touch pixels of the display panel. The display panel to which the underside of fixed base 1031 may be attached may be display panel 120 of FIG. 1, for example. With reference to FIG. 10, in one or more embodiments, the outlined regions 906 may be attached to the display panel with a conductive adhesive while other regions may be attached using a non-conductive adhesive. Conductive adhesives may be isotropic or anisotropic, and can be any suitable electrically conductive adhesives.

Figure 11:
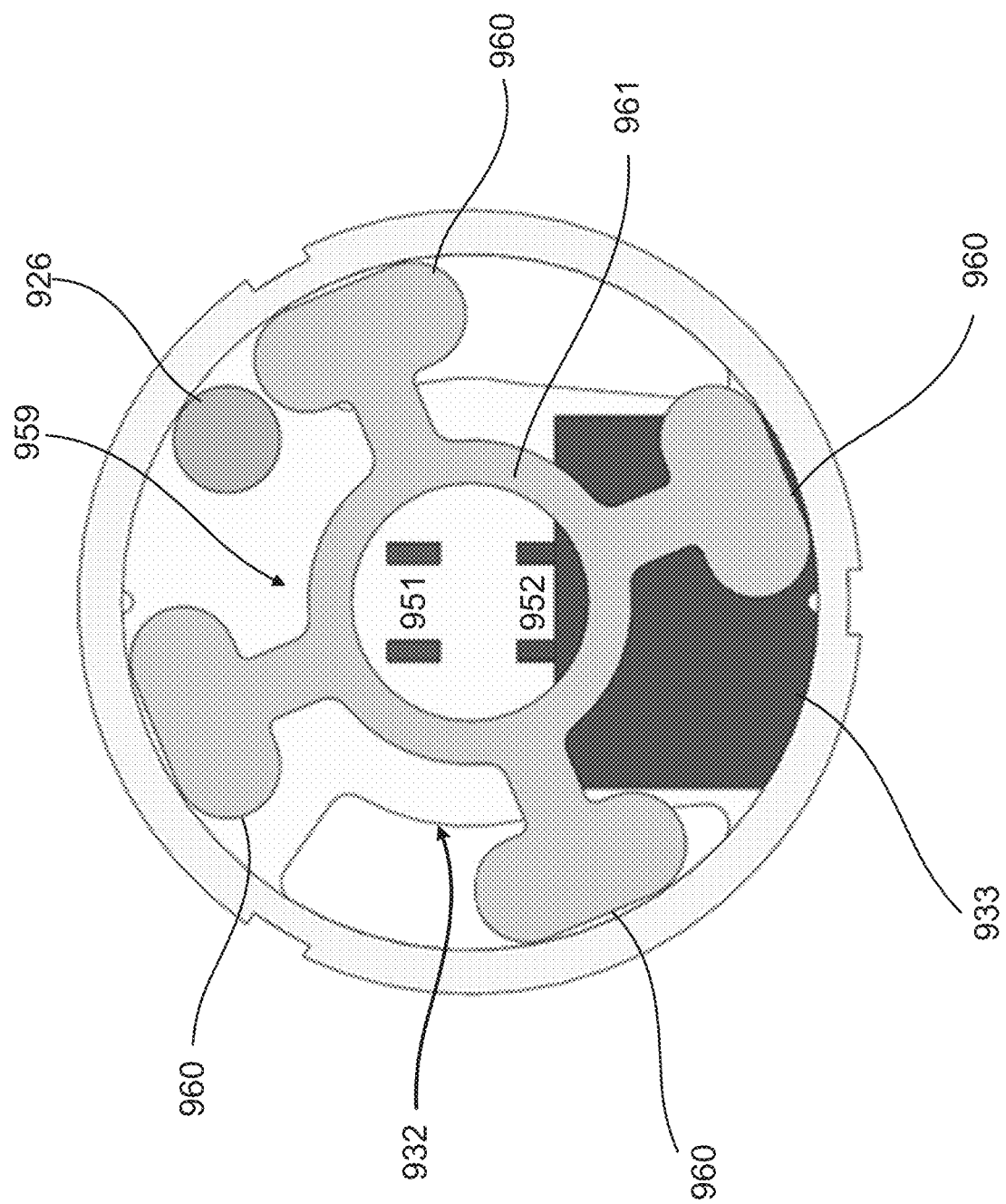
FIG. 11 depicts an example conductive structure that may be used in place of a rotary wheel and thin bearing, according to one or more embodiments.

FIG. 11 depicts an example conductive structure 959 that may be used in place of a rotary wheel and thin bearing, according to one or more embodiments. As an alternative to the thin bearing 226 described in FIG. 6A, conductive bearings may be used, such as, for example, those made of conductive PTFE (polytetrafluoroethylene). In such alternate embodiments, the rotary wheel may not be needed, and, as shown in FIG. 11, there may be a combination bearing and rotatable element 959 used in its place. Such alternate embodiments allow for a much thicker bearing, for example on the order of 1-2 mm thick, which can provide a stronger signal due to the increased conductivity of the bearing. It is noted that conductive PTFE may be formed by, for example, infusing carbon into PTFE to increase its conductivity. Thus, instead of using both the thin bearing 226 as shown in FIG. 6A, and the example rotary wheel 230 with alternating conductive 710 and nonconductive 720 regions as depicted in FIGS. 7A and 7B, conductive structure 959 shown in FIG. 11 may be used. Exemplary conductive structure 959 has, as shown, a central ring 961 from which several peripheral regions 960 protrude. In the depicted example there are four peripheral regions, spaced at 90 degree intervals around a central ring 961. In other examples, greater, or fewer, peripheral regions may be used. Peripheral regions 960 have a long dimension that is tangential to the inner ring, as shown, and they alternatively pass over the conductive pads provided on the top of the fixed base 932. For example, the alternate fixed base 932 illustrated in FIGS. 9A and 9B may be used. Thus, peripheral regions 960 of the conductive structure 959 alternatively couple to sensing regions 925 (not shown in FIG. 11, but shown in FIG. 9B at the top left) and 926, as well as grounded region 933 of the top of fixed base 932. As a result, as the conductive structure 959 is rotated, there are changes in the capacitive coupling between sensing regions 925, 926 and grounded region 933. Since structure 959 is itself conductive, the capacitive coupling is an electrical connection if, as in this example, there is no bearing provided in between the top of fixed base 932 and conductive structure 959. It is also noted that, given the spacing of peripheral regions 960, conductive region 963 of fixed base 932 is always coupled or connected to conductive structure 959. As conductive structure 959 rotates, however, the capacitive coupling between peripheral regions 960 and sensing regions 925 (not shown) and 926 change. In one or more embodiments, these changes may be used to determine the rotational orientation of the conductive structure 959, and thus of the rotational knob interface. As noted, in one or more embodiments, the conductive structure 959 also acts as a bearing, but now may be considerably thicker than, for example, the thin bearing 226 described above.

As noted, the fixed base 932 of FIG. 11 is the same as the example fixed base 932 of FIGS. 9A and 9B, described above. As shown in FIG. 9A, a click sensing pad 920 is provided on the underside of fixed base 932. This click sensing pad 920 is connected to switch pads 951 on the upper side of fixed base 932. Similarly, grounded region 933 is connected to switch pads 952 on the upper side of fixed base 932. A dome switch (not shown) may be connected between switch pads 951 and 952, e.g., dome switch 950 shown in FIG. 9B, to sense click.

Figure 12B:
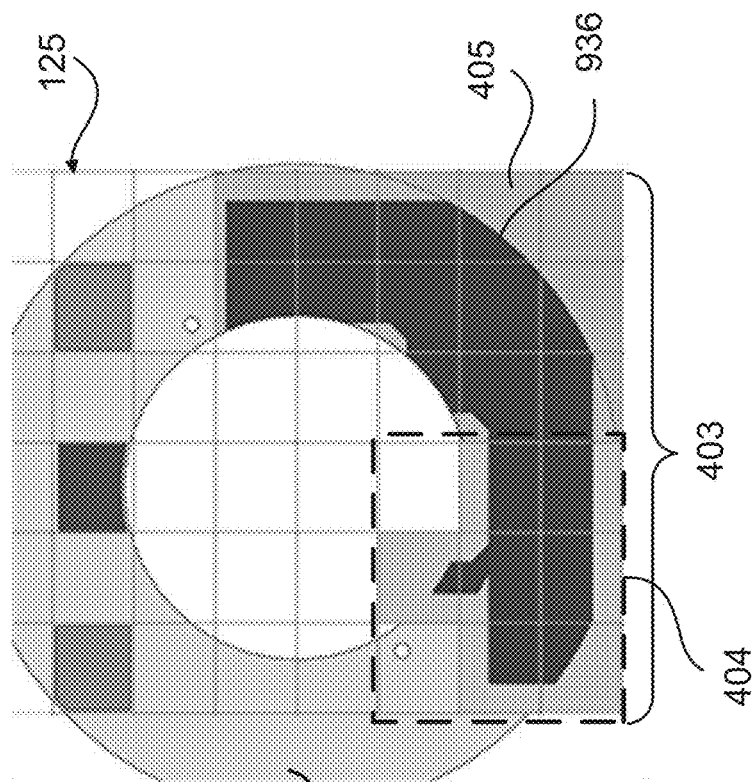
FIG. 12B illustrates half of the pixels under the conductive region shown in FIG. 15A being driven by a sensing waveform during a pre-defined time interval, according to a knob shift detection method, according to one or more embodiments.
Figure 12A:
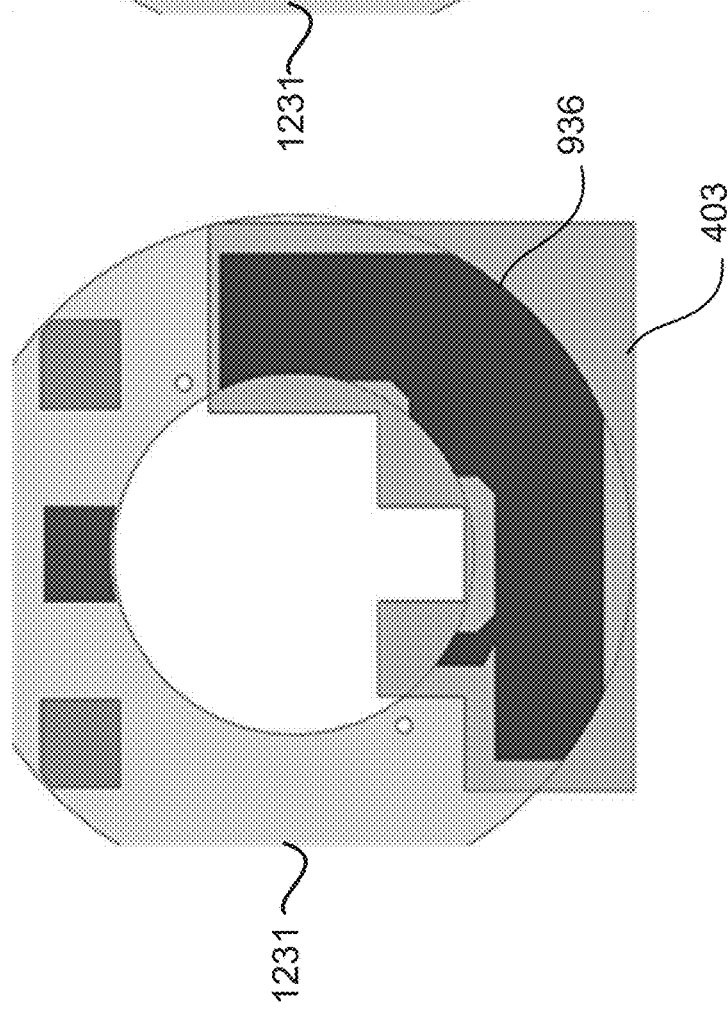
FIG. 12A illustrates, from a view underneath the display panel, a fully grounded set of grounding pads provided underneath a conductive region on the underside of a fixed base bottom, according to one or more embodiments.
Figure 13:
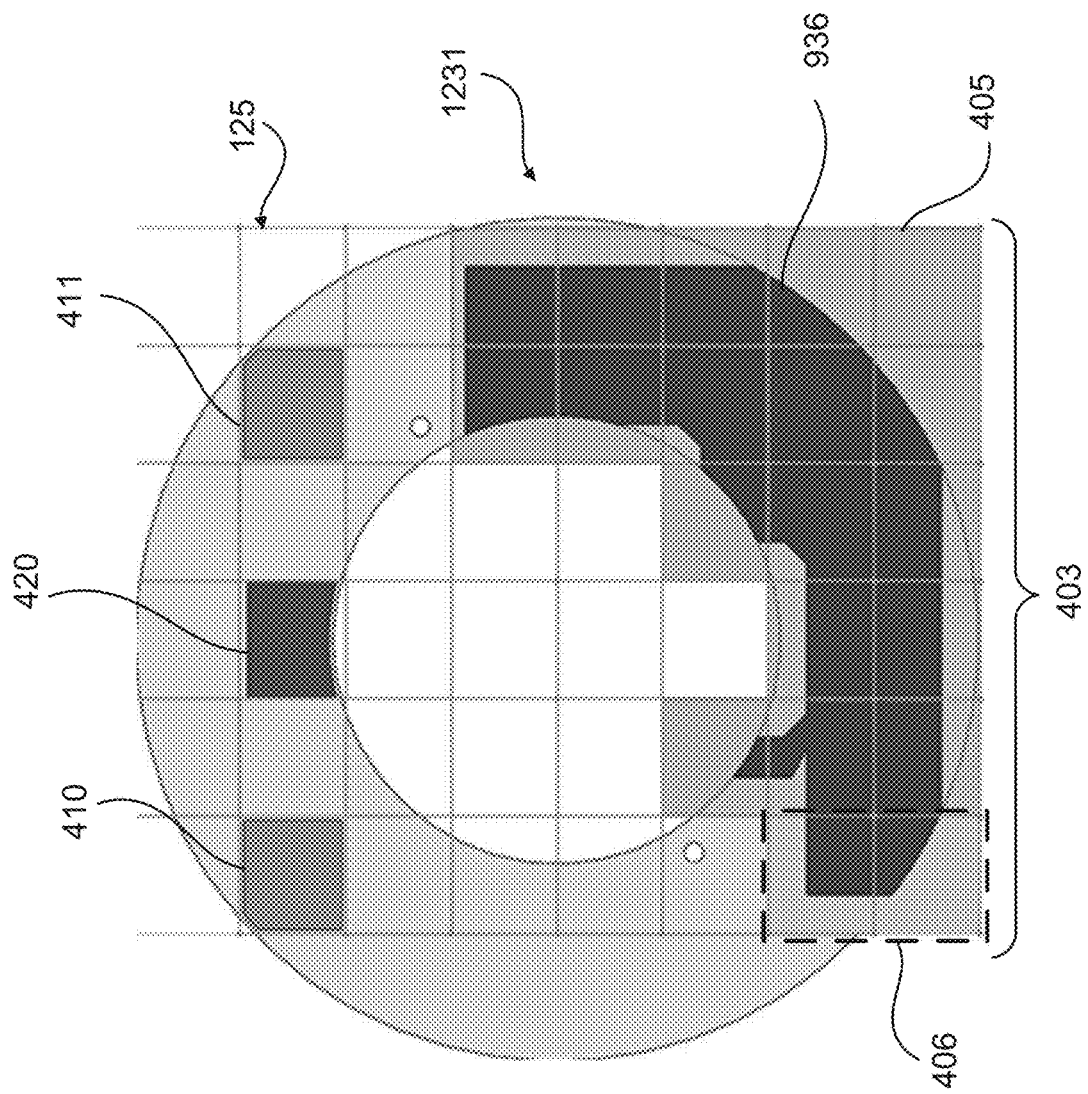
FIG. 13 illustrates the apparatus of FIG. 12B, where a subset of pixels provided underneath a conductive region of a rotatable knob base bottom being driven by a sensing waveform, according to an example alternate knob shift detection method, according to one or more embodiments.

Next described, with reference to FIGS. 12A through 13, are two example methods for detecting a shift of the rotatable knob interface relative to the surface of the input device. A shift in knob base can indicate a failure of the rotatable knob interface. Thus, detecting such a shift may be used to determine failure of the rotatable knob interface.

A first example method of shift detection is described with reference to FIGS. 12A and 12B. FIGS. 12A and 12B illustrate, from a point of view that is underneath the display panel of the input device, a set of electrodes 403 of an example display panel that are provided underneath a grounded region 936 on the underside of a fixed base 1231 of an example rotatable knob interface, according to one or more embodiments. As noted above, grounded region 936 is so-called because the electrodes of the display panel over which it is provided are, during an input sensing interval, driven with a reference signal. However, in the first example method of shift detection, this is modified, and not all of the electrodes of the display panel that lie under the grounded region are driven with the reference signal of a regular input sensing interval. As is illustrated in FIG. 12A, in a first pre-defined time interval, all of the electrodes 403 that couple to grounded region 936 are driven with a reference signal. At a later time, shown in FIG. 12B, during a second pre-defined time interval, a first subset of the electrodes 403, for example half of electrodes 403, in a first subset region 404 (surrounded by a dashed line boundary in FIG. 12B), may be driven by a sensing waveform, and the remaining electrodes of the set of electrodes 403, e.g., those in a second subset region 405, may be driven by the reference signal.

The configuration of FIG. 12A, where all of electrodes 403 lying under the grounded region 936 of the fixed base 1231 are driven by the reference signal, is, as described above, the normal scheme used during input sensing, e.g., during sensing of a rotation of the rotatable knob interface. However, the configuration of FIG. 12B occurs during a specific time interval outside of the normal sensing scheme, e.g., not during a standard input sensing interval, where, for example, half of the electrodes 403, those in first subset region 404, are driven by a sensing waveform. Because the entire grounded region 936 is electrically connected, during the second pre-determined time interval the electrodes in first subset region 404, although driven by a sensing signal, are also grounded, as both first subset region 404 and second subset region 405 remain connected via grounded region 936 of the fixed base 1231. In an embodiment, an analog to digital converter (ADC) may be used to sense capacitance on electrodes in first subset region 404 that are driven with a sensing signal. In such an embodiment, for a given electrode in first subset region 404, a reading on the ADC will change as a function of its ground loading. In some embodiments, the greater the ground loading, the lower the signal on the ADC. Thus, in such embodiments, when the rotatable knob interface is in its correct place, above the first subset region 404, the electrodes of first subset region 404 will see a certain value on a connected ADC that reflects grounded loading via grounded region 936. However, if the rotatable knob interface slips, and grounded region 936 of fixed base 1231 is no longer above one or more electrodes of first subset region 404, a higher value on an ADC connected to that electrode will be seen. In an embodiment, this higher ADC value may be used to detect a slip, or translation, of the fixed base 1231, and thus the rotatable knob interface. Thus, in an embodiment, ADC values of the electrodes in first subset region between successive second pre-defined intervals may be compared to determine a shift. Alternatively, a given reading for an electrode in a second pre-defined interval may be compared to an ADC value for that electrode at manufacture, following the fixed base being attached to the display panel in its intended position, to determine if the fixed base 1231 has shifted. As noted, the second pre-defined interval occurs outside of normal input sensing, and thus additional time may need to be allocated for shift detection within an input sensing scheme.

In alternate embodiments, the set of electrodes 403 may be divided into non-equal subsets, where the number of electrodes in first subset region 404 is less than the number of electrodes in second subset region 405. For example, the number of electrodes in first subset region 404 may be some fraction of the total number of electrodes in set of electrodes 403, such as, for example, ⅓, ¼ or some other fractional value less than 1.

In a second example method of shift detection, which is a variation of the first example method, the same principle of connected ADC value changing as a result of ground loading may be utilized in a different manner. In the second example method a first subset region of electrodes lying under grounded region 936 may be driven with a sensing signal even during normal input sensing. This is illustrated in FIG. 13. With reference thereto, FIG. 13 shows a first subset region 406 of electrodes of the grid of electrodes 125 of the display panel. First subset region 406 of electrodes (shown with a dashed line boundary in FIG. 13) are provided underneath the grounded region 936 of the fixed base 1231.

In an embodiment, a previous baseline state of a resulting signal received on the electrodes in subset region 406 may be compared to a currently acquired resulting signal to determine if any shift of the fixed base has occurred. In one or more embodiments, as was the case for the first example method, the resulting signal may be measured using the value on an ADC connected to an electrode, and a change in ADC value may be used to detect shift of the fixed base 1231, and thus of the rotatable knob interface, may be determined from a change in the value on a connected ADC for the electrodes in first subset region 406.

In an embodiment, for the example method illustrated in FIG. 13, the set of electrodes 403 that are coupled to grounded region 936 may be divided into non-equal subsets, where the number of electrodes in the first subset region 406, which receive the sensing signal during an input sensing interval, is less than the number of electrodes in second subset region 405. For example, the number of electrodes in first subset region 406 may be some fraction, less than ½, of the total number of electrodes in the set of electrodes 403. For example, it may be ¹/₁₀th of the total number of electrodes that are in the set of electrodes 403. Or, for example, it may be 20%, or 15%, of the total number of electrodes in set of electrodes 403, or any other fractional value between 0 and ½.

Because in the second example method of shift detection, the electrodes in first subset region 406 are always driven by sensing signals during regular input sensing intervals, the comparison may be made between two regular (e.g., successive) input sensing intervals, and no additional time interval need be added to the input sensing schema for shift detection.

Figure 14:
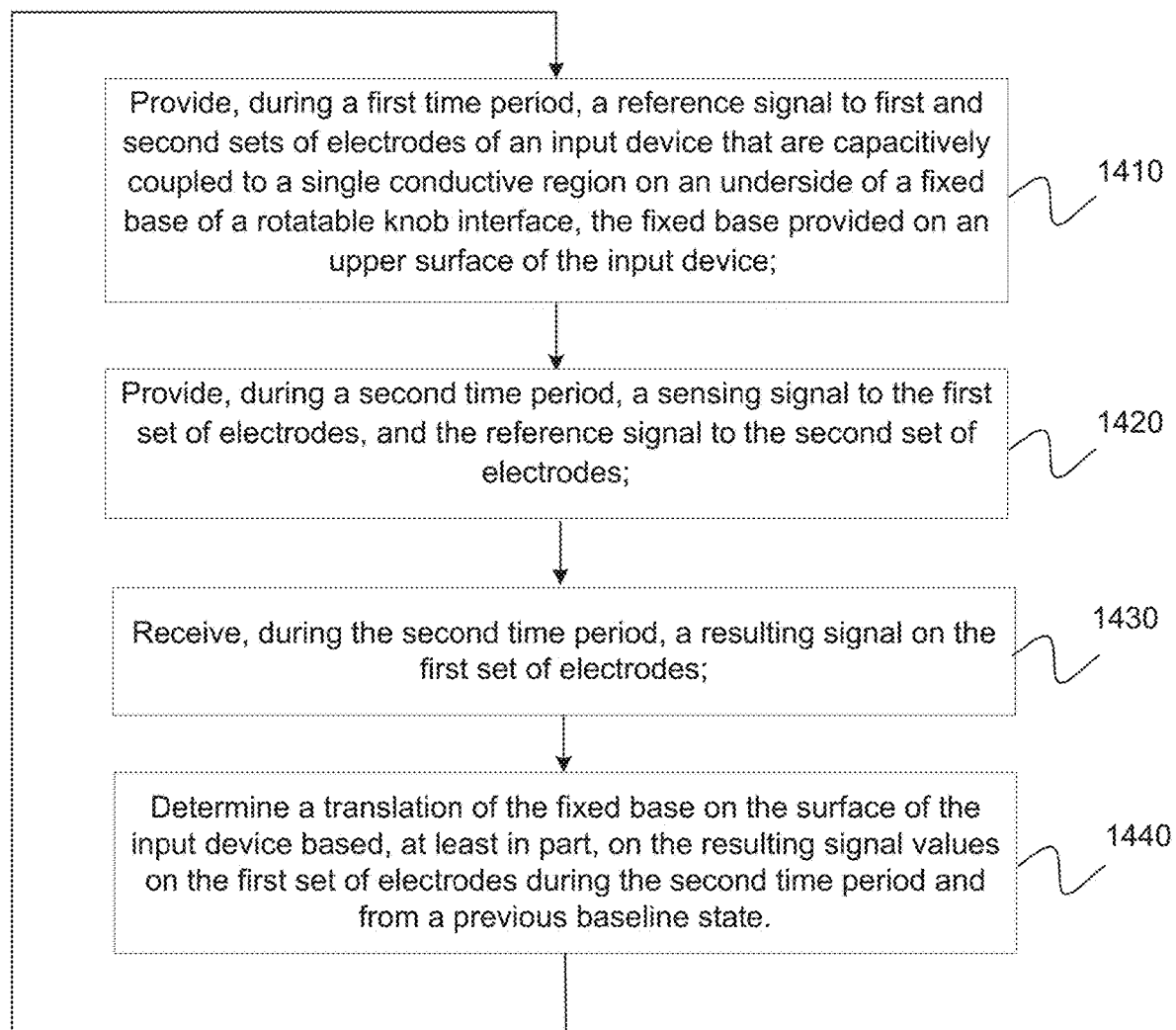
FIG. 14 illustrates an example method for implementing a rotatable knob interface on an example input device, according to one or more embodiments.

FIG. 14 is a process flow chart illustrating a method 1400 for detecting shift of a fixed base of an electronic interface, for example a rotatable knob interface, on an example electronic device. The method has two stages, respectively corresponding to the two examples illustrated in FIGS. 12A and 12B respectively, described above. As noted, detecting knob shift is one mechanism of failure.

Method 1400 includes blocks 1410 through 1440. In alternate embodiments, method 1400 may have more, or fewer, blocks. Method 1400 begins at block 1410, where, during a first time period, a reference signal is provided to first and second sets of electrodes of an input device that are capacitively coupled to a single conductive region on the underside of a fixed base of a knob interface. The fixed base is provided on a surface of an input device (e.g., the electronic device 100). For example, the conductive region may be grounded region 936 shown in FIGS. 12A and 12B.

From block 1410, method 1400 proceeds to block 1420, where, during a second time period, a sensing signal is provided to the first set of electrodes, and the reference signal to the second set of electrodes. For example, the first set of electrodes may be the electrodes in region 404 of FIG. 12B, and the second set of electrodes may be the electrodes in region 405 of FIG. 12B, all of which are coupled to conductive region 936 on the fixed base 1231.

From block 1420, method 1400 proceeds to block 1430, where, during the second time period, a resulting signal on the first set of electrodes is received. As noted above, the resulting signal is the same signal used to drive the first set of electrodes, except that when it is measured it may have been modified by the relative positions of the fixed base 1231 and the input device.

From block 1430, method 1400 proceeds to block 1440, where, based at least in part on the resulting signal values on the first set of electrodes obtained during the second time period, and a previous baseline state for the first set of electrodes, a translation of the knob interface on the surface of the input device is determined. In one or more embodiments, this determination may be performed by firmware stored in a memory of the input device. Method 1400 may terminate at block 1440, or, as shown in FIG. 14, it may be repeated, and thus from block 1440, method 1400 may return to block 1410. In one or more embodiments, the baseline state may be pre-stored, e.g., at manufacturing, or, for example, may be a set of resulting signal values obtained during a prior second time period of a prior instance of method 1400.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

The invention claimed is:

1. A sensing system, comprising:
a display panel;
a rotatable electronic device disposed over the display panel, the rotatable electronic device comprising:
a fixed base disposed over the display panel, the fixed base comprising a first region, a click sensing pad, and a switch disposed between the first region and the click sensing pad; and
a rotatable knob disposed over the fixed base; and
a processing system configured to:
sense a click based on the rotatable knob being pressed such that the switch couples the first region to the click sensing pad.

2. The sensing system according to claim 1, wherein the switch is a dome switch.

3. The sensing system according to claim 1, wherein the first region is grounded.

4. The sensing system according to claim 1, wherein the fixed base includes apertures configured to reduce parasitic capacitance between conductive regions on an underside of the rotatable knob and sensor electrodes of the display panel.

5. The sensing system according to claim 1, wherein the first region of the fixed base is attached to the display panel via a conductive adhesive.

6. The sensing system according to claim 5, wherein other regions of the fixed base are attached to the display panel via a non-conductive adhesive.

7. The sensing system according to claim 1, wherein the click sensing pad is disposed on an underside of the fixed base, wherein the switch is disposed on an upper side of the fixed base, and wherein the click sensing pad is connected to one or more switch pads on the upper side of the fixed base.

8. The sensing system according to claim 1, wherein the rotatable knob comprises a rotary wheel and a bearing.

9. The sensing system according to claim 8, wherein the bearing is made of conductive polytetrafluoroethylene (PTFE).

10. The sensing system according to claim 1, wherein the rotatable knob comprises a combination bearing and rotatable element having a central ring and a plurality of protruding peripheral regions.

11. The sensing system according to claim 10, wherein the combination bearing and rotatable element is conductive and has a thickness in the range of 1-2 mm.

12. A rotatable electronic device for use with a display panel, the rotatable electronic device comprising:
a fixed base disposed over the display panel, the fixed base comprising a first region, a click sensing pad, and a switch disposed between the first region and the click sensing pad; and
a rotatable knob disposed over the fixed base;
wherein the switch is configured such that pressing on the rotatable knob couples the first region to the click sensing pad.

13. The rotatable electronic device according to claim 12, wherein the switch is a dome switch.

14. The rotatable electronic device according to claim 12, wherein the first region is grounded.

15. The rotatable electronic device according to claim 12, wherein the fixed base includes apertures configured to reduce parasitic capacitance between conductive regions on an underside of the rotatable knob and sensor electrodes of the display panel.

16. The rotatable electronic device according to claim 12, wherein the click sensing pad is disposed on an underside of the fixed base, wherein the switch is disposed on an upper side of the fixed base, and wherein the click sensing pad is connected to one or more switch pads on the upper side of the fixed base.

17. The rotatable electronic device according to claim 12, wherein the rotatable knob comprises a rotary wheel and a bearing.

18. The rotatable electronic device according to claim 12, wherein the rotatable knob comprises a combination bearing and rotatable element having a central ring and a plurality of protruding peripheral regions.

19. A method for click sensing using a rotatable electronic device, comprising:
providing a rotatable electronic device disposed over a display panel, the rotatable electronic device comprising a fixed base disposed over the display panel and a rotatable knob disposed over the fixed base, wherein the fixed base comprises a first region, a click sensing pad, and a switch disposed between the first region and the click sensing pad; and
sensing, by a processing system, a click based on the rotatable knob being pressed such that the switch couples the first region to the click sensing pad.

20. The method according to claim 19, wherein the switch is a dome switch, and the first region is grounded.

* * * * *